(12) United States Patent  
Gough et al.

(10) Patent No.: US 8,793,275 B1  
(45) Date of Patent: Jul. 29, 2014

(54) METHOD, APPARATUS AND SYSTEM FOR DISTRIBUTING QUERIES AND ACTIONS

(75) Inventors: Michael L. Gough, Ben Lomond, CA (US); James J. Gough, Los Gatos, CA (US)

(73) Assignee: G&H Nevada-Tek, Los Altos, CA (US)

( * ) Notice: Subject to any disclaimer, the term of this patent is extended or adjusted under 35 U.S.C. 154(b) by 437 days.

(21) Appl. No.: 10/358,112

(22) Filed: Feb. 3, 2003

Related U.S. Application Data

(60) Provisional application No. 60/355,462, filed on Feb. 5, 2002.

(51) Int. Cl.  
*G06F 17/30* (2006.01)

(52) U.S. Cl.  
USPC ........................................................ 707/770

(58) Field of Classification Search  
USPC ............... 707/3, 10, 706, 722, 758, 769, 770  
See application file for complete search history.

(56) References Cited

U.S. PATENT DOCUMENTS

| | | | |
|---|---|---|---|
| 5,692,174 A | | 11/1997 | Bireley et al. |
| 5,790,640 A | * | 8/1998 | Tassa et al. .............. 379/100.15 |
| 5,974,441 A | * | 10/1999 | Rogers et al. ................. 709/200 |
| 5,990,883 A | * | 11/1999 | Byrne et al. ................... 715/721 |
| 6,021,186 A | * | 2/2000 | Suzuki et al. ............ 379/100.12 |
| 6,633,873 B1 | * | 10/2003 | Nakamura ....................... 707/10 |
| 7,007,275 B1 | * | 2/2006 | Hanson et al. ................ 718/101 |
| 2002/0004796 A1 | * | 1/2002 | Vange et al. ..................... 707/10 |
| 2002/0091697 A1 | * | 7/2002 | Huang et al. .................... 707/10 |
| 2002/0095349 A1 | * | 7/2002 | Sugiyai ........................... 705/26 |
| 2002/0099685 A1 | * | 7/2002 | Takano et al. ..................... 707/1 |
| 2002/0133504 A1 | * | 9/2002 | Vlahos et al. .............. 707/104.1 |
| 2003/0149755 A1 | * | 8/2003 | Sadot ............................ 709/223 |

* cited by examiner

Primary Examiner — Cam-Linh Nguyen  
(74) Attorney, Agent, or Firm — TIPS Group

(57) ABSTRACT

A virtual database system including multiple independent database servers is disclosed. The virtual database system uses a unified interface to query multiple independent databases, and the multiple independent database servers include appliances, general servers, etc. The system preferably includes a packet-based network, and a number of physically separated, independent database servers coupled to the network, where each of the database servers has a unique address and an independent database interface. Preferably, each database server includes an database created at least in part by the passive capture of data on the network, and each of which supports database queries including at least one of metadata and text via its respective interface. Queries are distributed concurrently to a number of appliances as virtual user queries.

4 Claims, 30 Drawing Sheets

METHOD, APPARATUS AND SYSTEM FOR DISTRIBUTING QUERIES AND ACTIONS

CROSS REFERENCE TO RELATED APPLICATION

This application claims the benefit of provisional patent application No. 60/355,462, filed Feb. 4, 2002 on behalf of Michael L. Gough and James J. Gough, entitled Method and Apparatus for Distributing Queries and Actions, Docket No. 60333-303900 (59333-8039.US00) incorporated herein by reference for all purposes.

FIELD OF THE INVENTION

The present invention relates generally to database management systems and, more particularly to query systems and methods for data and document management systems.

BACKGROUND OF THE INVENTION

In an office setting, it is typical to find many documents, both in paper and electronic form. These documents may contain important information relating to business, government or individuals and, as such, it is important to be able to securely store and reliably retrieve this information.

In the normal course of business, a large number of documents are generated each day. The information in these documents is, most likely, needed at a later time. It is sometimes difficult to find the correct document in an office setting because documents are sometimes misfiled, misplaced or simply lost. In some cases, no system of organizing documents is used, which likely results in the inaccessibility of documents in a timely manner.

Digital technology has been introduced to help manage this problem. Digital scanners, fax machines and the like allow a user to create an electronic version of documents which would otherwise be stored only on paper. This allows vast numbers of documents to be stored in a relatively small space using a personal computer.

The personal computer contains a disk drive, and the documents are stored as files on this disk drive. The personal computer has the option of introducing a system of directories to contain documents using a hierarchical file system on the computer. Such hierarchical file systems are common to personal computer operating systems such as Windows, a product of Microsoft Corporation and also Linux which is available for free.

The hierarchical method for organizing documents requires ongoing organization work to be performed. It is sometimes impractical for busy people to fastidiously organize their documents. Thus, even though documents are stored on a disk drive in a personal computer, they are often still inaccessible in a timely manner.

One product that has appeared to address the problem of automatically indexing and providing access to documents is the Ricoh eCabinet. This device receives documents via standard protocols such as SMTP or FTP which are widely used and well known to those skilled in the art. Each document is indexed using a text indexing engine. It is often necessary to perform some preprocessing of the document, such as OCR, before the document is ready to be indexed. The eCabinet performs this function when needed.

When a user desires to locate a document, he is able to communicate with the eCabinet using a web based interface. He then enters information regarding the content of the document he desires, or other information regarding the metadata of the document. Upon entering this information, the user submits the information by clicking a button presented in the user interface. The information is transmitted to the eCabinet as a "query." The eCabinet receives the query and processes it using its internal database. The results of the query are compiled into a result set within the eCabinet. This result set contains pointers to the desired documents in the database.

The eCabinet then prepares a web page to be presented to the user that contains the results of the query. Sometimes the results of the query are too numerous to present on one web page, so buttons are provided to navigate through multiple web pages that present the result.

The user of the eCabinet may decide to perform actions on documents that he finds in the web page(s). The user selects document icons presented in the web page and specifies a desired action. An action specification which contains the selections made by the user is sent to the eCabinet which receives the action specification and performs the action. Such actions include copying a document, changing the summary, adding some information such as keywords or hierarchy path to aid in locating the document later, or deleting the document.

As the eCabinet receives more and more documents, its internal database gradually grows larger. Although it is able to recover disk space by moving documents to other storage, such as an NFS server, the nature of the database is that it must remain intact in order to allow the user to locate documents by their content and metadata. Thus, the data base gradually grows to consume all available disk space.

Another problem occurs when the user(s) submit information to the eCabinet too quickly. The eCabinet becomes swamped with incoming work. In some cases, the rate at which the eCabinet can consume documents is overmatched by the workload. Thus, the eCabinet can never catch up and falls further behind with the passage of time. This presents an additional problem because documents are processed in queues and therefore the documents submitted may take a long time to be processed while waiting for previous documents to be processed. Additionally, the eCabinet's performance is somewhat degraded when it is performing the task of OCR and or document indexing.

One may attempt to solve these workload problems by introducing multiple eCabinets. This method works well for ingesting the documents faster, although it requires the user to specify which eCabinet to which to send the documents, although he may be completely ignorant of which eCabinet(s) are busy and which are idle.

Another problem with multiple eCabinets is that when one is searching for a document he is often in a hurry. Thus it is bothersome to have to interrogate multiple eCabinets, especially if there are a large number of them.

Of course, it is natural for different departments in an organization to purchase and operate separate eCabinets. Sometimes, it is desirable for a high level manager or other person with a general query to interrogate the eCabinets in these different departments. Thus, the problem of interrogating multiple eCabinets is not restricted to the case where the workload was too great for one eCabinet; multiple eCabinets are a natural occurrence in a large organization.

Accordingly, what is needed is a method, apparatus and system for distributing queries and actions that do not suffer from the problems listed prior.

SUMMARY OF THE INVENTION

One aspect of the present invention is to provide a virtual database system including multiple independent database servers. The "virtual database system" is the use of a unified interface to query multiple databases, and the "multiple independent database servers" include appliances, general servers, etc. The system preferably includes a packet-based network, and a number of physically separated, independent database servers coupled to the network, where each of the database servers has a unique address and an independent database interface. Preferably, each database server includes a database created at least in part by the passive capture of data on the network, and each of which supports database queries including at least one of metadata and text via its respective interface.

In another aspect of the present invention, a virtual database system includes multiple databases includes a network, a number of databases capable of receiving queries via the network, and a virtual database server being capable of receiving a virtual database query from an originator via the network. The virtual database server parses the virtual database query into a number of related database queries, and presents the number of related database queries to the number of databases for concurrent processing. The virtual database server collects responses to the number of related database queries from the number of databases as they are generated and maps the responses into a unified response to provide to the originator of the virtual database query. In one embodiment, the originator is at least one of a human originator, a virtual database server originator, and an agent originator.

In yet another aspect of the present invention, a method is provided for viewing multiple appliance databases without the requirement for modifying those appliances by distributing queries as a virtual user. In summary, the method includes receiving a database query from a user, distributing said query to a plurality of appliance servers as a virtual user, each of which has its own query interface. By "virtual user" it is meant that the appliance server cannot tell that the query being presented to it is other than a query being presented directly from a user, i.e. the process of the present invention emulates the actions of a user. The method further includes receiving records from said plurality of appliance servers responsive to said query; and consolidating said records from said plurality of appliance servers for presentation to said user An advantage of the present invention is that a user can query databases on multiple appliance servers with a single query which is distributed concurrently to all of the appliance servers, and is provided with a consolidated reply. As such, the collective databases on the multiple appliance servers become one, large "virtual" database.

Another advantage of the present invention is that the appliance servers do not need to be modified in order to be queried, since the system, apparatus, and method of the present invention emulate a "virtual user" as far as these appliance servers are concerned.

Another advantage of the present invention is that the functionality of the multiple database query system can be implemented as a stand-alone general server, as a virtual server (e.g using VMWare or the like), or can be incorporated into the appliance server software.

These and other advantages of the present invention will become apparent upon a reading of the following descriptions and a study of the various figures of the drawing.

BRIEF DESCRIPTION OF THE DRAWINGS

FIGS. 9a-9d are flow diagrams illustrating the virtual range to physical range process of FIG. 7a;

DETAILED DESCRIPTION OF THE PREFERRED EMBODIMENTS

Figure 1:
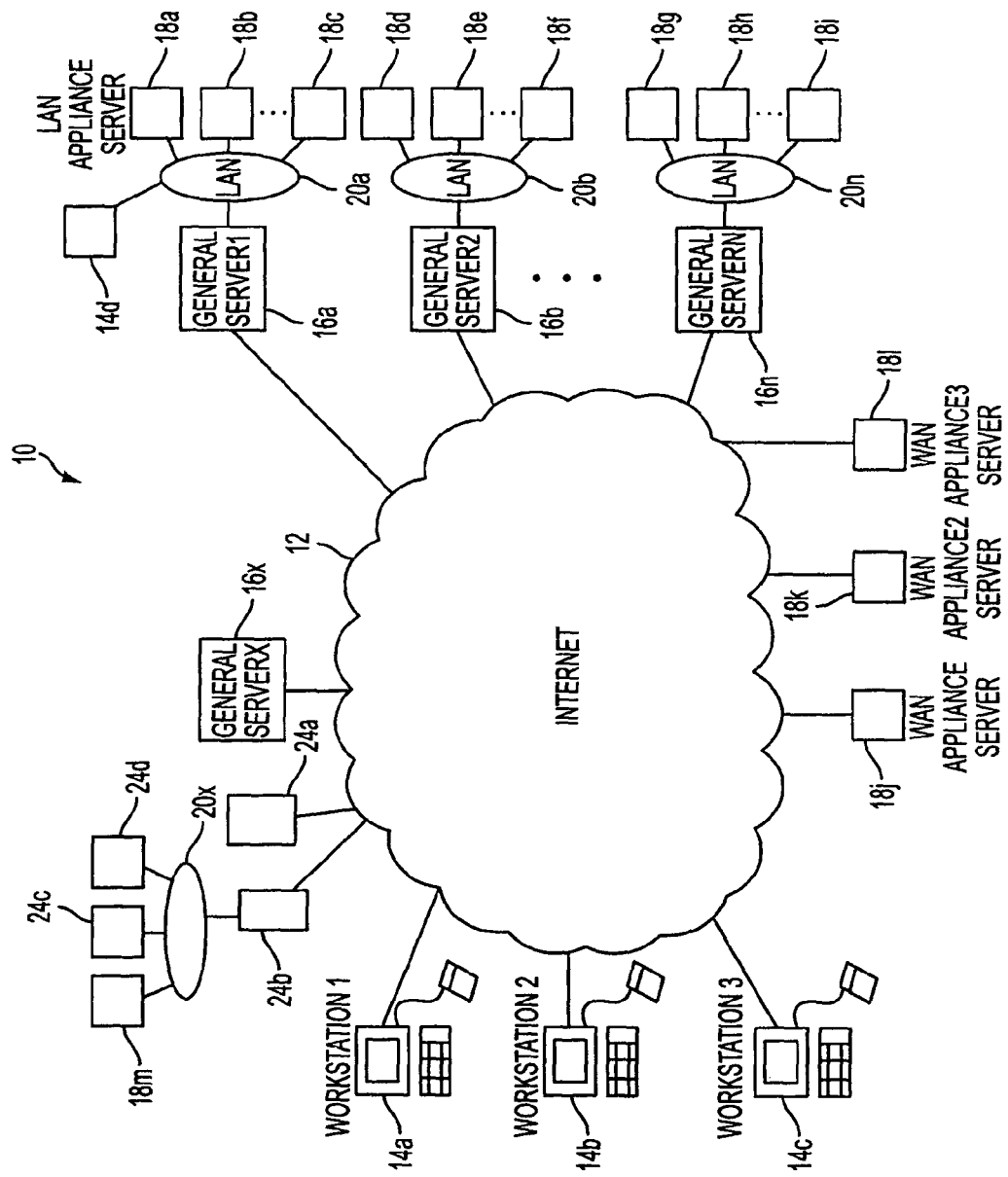
FIG. 1 is an illustration used to describe the method and apparatus for distributing queries and actions in accordance with the present invention.

FIG. 1 illustrates a system 10 for distributing queries and actions in accordance with the present invention. The Internet WAN 12 serves to connect workstation computers 14a, 14b, 14c, etc., to general servers 16a, 16b, ..., 16n, which are connected to appliance servers 18a-18i (such as an eCabinet® appliance server from Ricoh Inc.) via Local Area Networks (LANs) 20a, 20b, ..., 20n. Other network devices (e.g. personal computers, network computers, etc.) may of course be connected to the LANs as well. For example, a workstation 14d can be connected directly to LAN 20a. The appliance servers 18a-18i are accessed by a workstation (e.g. workstation 14a, 14b, 14c, etc.) via the Internet through the intermediary of a general server (e.g. general server 16a-16n). The general server acts, in part, as a firewall, thus protecting the LANs 20a-20n from unauthorized access via the Internet 12.

Of course, the workstation 14d is behind the firewall in general server 16a, and does not need the security of a firewall.

Preferably, the general servers provide SSL encryption protocols for accessing sensitive information over the Internet from, for example, the workstations 14a-14c. The general servers convert encrypted requests to the protocol used by the appliance servers and forwards the request to the appropriate appliance server. The appliance server processes the request and generates a reply which is received by the general server and encrypted for delivery over the Internet 12 to, for example, a workstation 14a-14c. Of course this process may involve streaming protocols, as will be appreciated by those skilled in the art. It is therefore likely that the reply is sent from a general server to a workstations over the Internet 12 in multiple packets over a period of time.

As also seen in FIG. 1, alternatively or additionally a general server 16n may be connected to one or more network appliance servers 18j, 18k, 18l, etc. via the Internet (other suitable WAN). Preferably the general server 16n and these appliances 18j-18l use an encrypted protocol as described above to protect the security of data transmitted over the inherently insecure environment of the Internet 12. Other data security techniques are well known to those skilled in the art, and are suitable for use with the present invention.

With continuing reference to FIG. 1, the general servers provide a multiple viewing environment with respect to multiple appliance servers. The general servers can also provide additional services, such as the aforementioned firewall and encryption services. It is preferable (but not essential) that the general servers of the present invention comprehensively support the protocols of the appliance servers in such a manner that they emulate the appliance server. In other words, users of workstations accessing data on appliance servers preferably have essentially the same experience working with the appliance servers through the intermediary of the general servers as they do when they are in direct communication with the appliance servers. Using the example of an eCabinet appliance server, a general server of the present invention connects to multiple eCabinet appliance servers and accesses them on behalf of a user at a workstation performing a query, action, or document ingest with respect to the eCabinet appliance servers In the exemplary system shown in FIG. 1, the general servers are separate units from the appliance servers. It will be appreciated by those skilled in the art the functionality of the general servers and the appliance servers can be combined as a single physical or logical server. For example, the functionality of a general server and an appliance server can be provided in a single physical device or server 24a (e.g. a personal computer, workstation, etc.). That is, for example, the server 24a provides the multi-viewing capabilities of the general servers and the document handling capabilities of the appliance servers. Furthermore, the server 24a can provide its multi-viewing capability with respect to other appliances with which it is in communication, such as another server 24b which also has the functionality of a general server and an appliance server, and with general servers 16a-16n and network appliances 18j-18l. Furthermore, the server 24b can access other appliances and servers such as appliance 18m and servers 24c and 24d via a LAN 20n.

Additionally or alternately, the funtionality of the general servers and appliance servers can be embodied in virtual environments, such as that provided by VMWare® of VMWare, Inc. of Palo Alto, Calif. Furthermore, the functionality of the general servers and the appliance servers can be distributed in a multiplicity of physical and/or virtual environments over a LAN, WAN or other connection.

It should also be noted while the exemplary system of FIG. 1 shows general servers and/or appliances coupled directly or indirection to a WAN such as the Internet, this is not a requirement for various implementations of the system. For example, general server 16a might not be coupled to the Internet or other WAN. Nonetheless, the workstation 14d can access the functionality of the general system 16a and the LAN applicances 18a-18c via the LAN 20a.

This approach allows a user to enjoy the apparent simplicity of accessing a single appliance server, while at the same time benefiting from the power of multiple appliance servers. This approach also provides for hierarchical arrangement of the present invention in such a manner that the general server accesses another general server as one of its appliance servers. This permits a multi-tier organizational structure and allows for different levels of management or government to access appliance servers in different branches of an organization, or access all of the appliance servers in the organization as a single virtual appliance. The general servers in such a hierarchy would often be connected to each other via a WAN network, although other connection methodologies are well known to those skilled in the art. This arrangement could allow a user to distribute a query in a branching manner that would eventually reach every appropriate appliance server in a world-wide organization.

Figure 2:
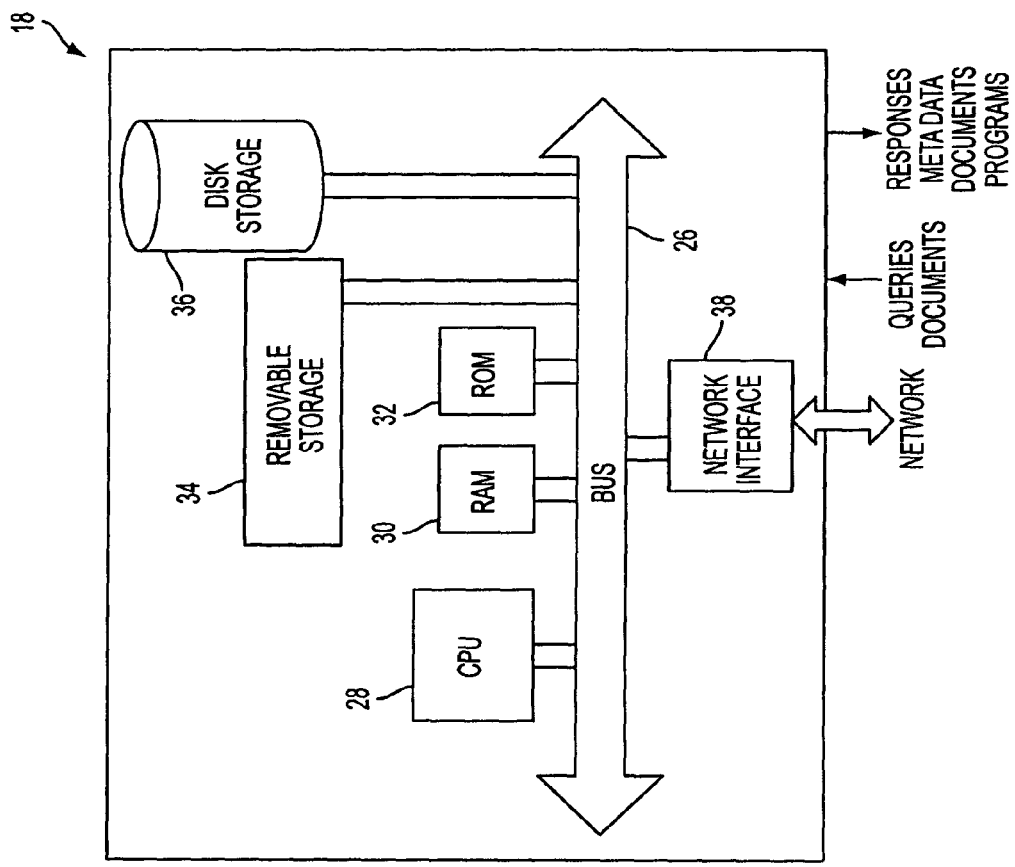
FIG. 2 is a block diagram of an appliance server of FIG. 1.

FIG. 2 shows an appliance server 18 with a bus 26 to which are connected a CPU 28, RAM 30, ROM 32, optional removable storage 34, and disk storage 36 for documents and the database that contains the index for them. A network interface 38 connects the appliance server 18 to a network (such as a LAN 20 or the Internet 12). Queries, actions, documents, and other information flow over this network interface 38. It will be appreciated by those skilled in the art that the appliance server 18 can be implemented on, for example, an Intel compatible computer system running a UNIX operating system.

Figure 3:
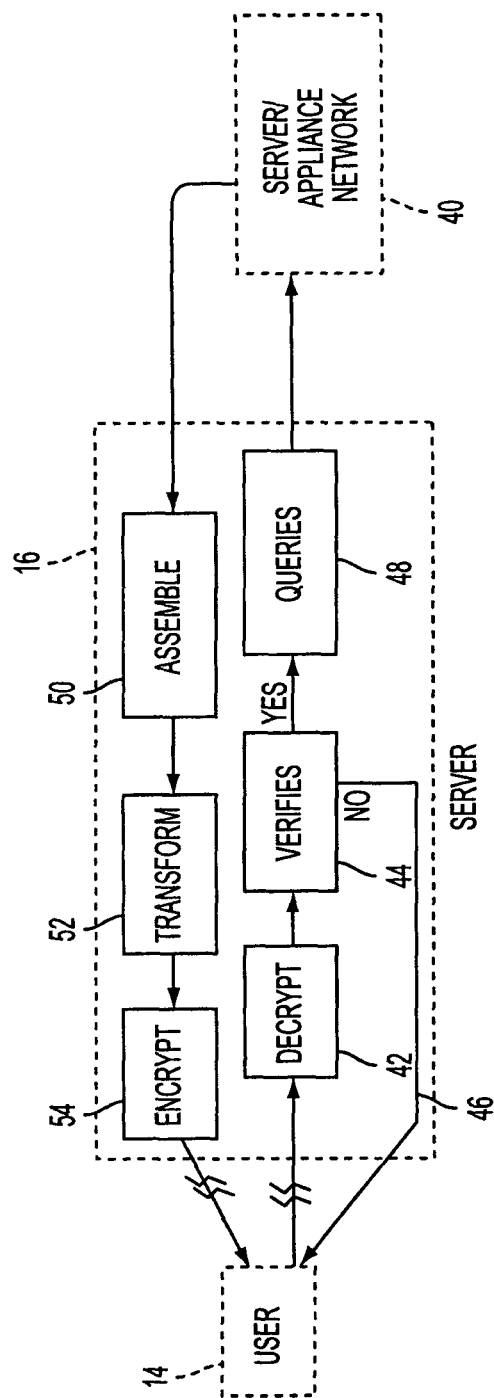
FIG. 3 is a block diagram of a general server of FIG. 1.

FIG. 3 shows a general server 16 interposed between a user workstation 14 and a network 40 of appliance servers. Requests and actions come in from the workstation 14 and are decrypted in a decryption module 42 as described above, as will be appreciated by those skilled in the art. Preferably, the request is parsed and verified in a verification module 44 so that it is certain that the request is properly formatted. Improper requests are not forwarded to the network of servers and appliances. Instead an error message is prepared and returned to the workstation 14 as indicated by the arrow 46. Multiple copies of a properly formatted query/action are generated by a queries module 48 and distributed contemporaneously to the various servers in the appliance server network 40. The set of appliance servers to which the request is sent may be configurable by the user, as will be appreciated by those skilled in the art. The responses are processed by the appliance servers and replies are sent back to the general server that generated the requests by first being assembled in an assembly module 50, transformed in a transformation module 52, and encrypted in an encryption module 54.

The assembly module 50 assembles responses from multiple appliances such that it appears to have been generated by a single appliance. As such, the user of workstation 14 can have the same interface and experience accessing data from a multiplicity of appliances as they would when they directly access data from a single appliance. The functionality of the assemble module 50 is described in greater detail subsequently.

The transform module 52 can be used to modify the interface of the appliance. Therefore, in many cases the transform module 52 is disabled. However, in some instances users want to change the interface with the appliances, and the transform module 52 permits this functionality.

For example, it may, in some instances, be desirable to provide a new "skin" to the aforementioned eCabinet appliance or similar document management appliance. In this connection the general server can introduce new visual elements into the web pages presented to the user by way of "filtering" the web pages being presented. A parser is used to convert the incoming web page (e.g. from the eCabinet) to an abstract syntax tree (AST). Parsing technology is well known to those skilled in the art. A web page generator traverses the AST and emits a new web page conforming to the new skin. This traversal may occur in arbitrary order, selecting desired portions of the AST for conversion back into HTML. At various points new HTML may be introduced to add to or replace portions of the original HTML generated by the eCabinet.

Figure 4:
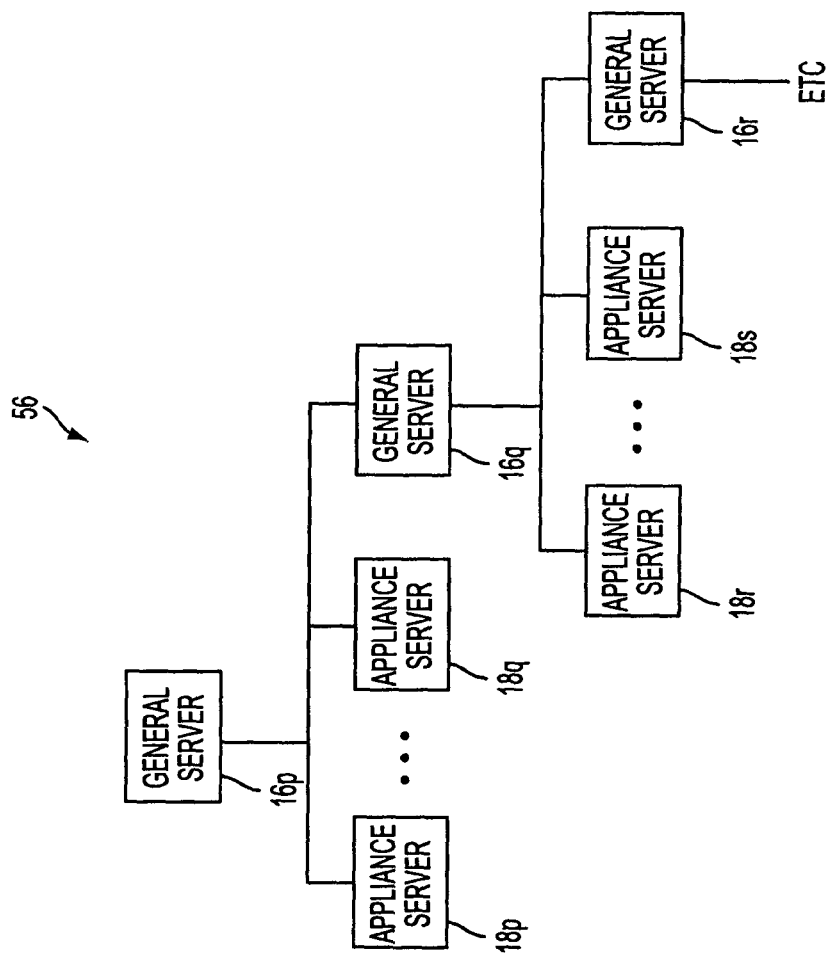
FIG. 4 illustrates a hierarchical arrangement of general and appliance servers of FIG. 1.

FIG. 4 illustrates a hierarchical arrangement 56 of general servers 16*p*, 16*q*, and 16*r*, and appliance servers 18*p*-18*q* and 18*r*-18*s*. Each general server 16 keeps a list of subordinate servers, which may be appliance servers or general servers. For example, general server 16*p* keeps a list of all of the servers below it on FIG. 4 (i.e. general servers 16*q* and 16*r*, and appliance servers 18*p*-18*q* and 18*r*-18*s*, etc.) General server 16*q* keeps a list of appliance servers 18*r*-18*s* and 16*r*, etc.). As will be appreciated by those skilled in the art, this list may be entered by a user in a configuration page, or obtained by automatically discovering what servers are available. For example, general server 16*q* is a subordinate server of higher level server 16*p* and is coupled to subordinate appliance servers 18*r*-18*s* and subordinate general server 16*r*. This hierarchical arrangement allows for hierarchical access to data on a network. For example, general server 16*p* could be the general server for a national organization, and would be able to access data from any server in the system 56. General server 16*q* could be a regional server for the organization, and would be able to access data from any of servers 18*r*-18*s* and 16*r*. General server 16*r* could be a site general server, and only be able to access information from the site.

Figure 5:
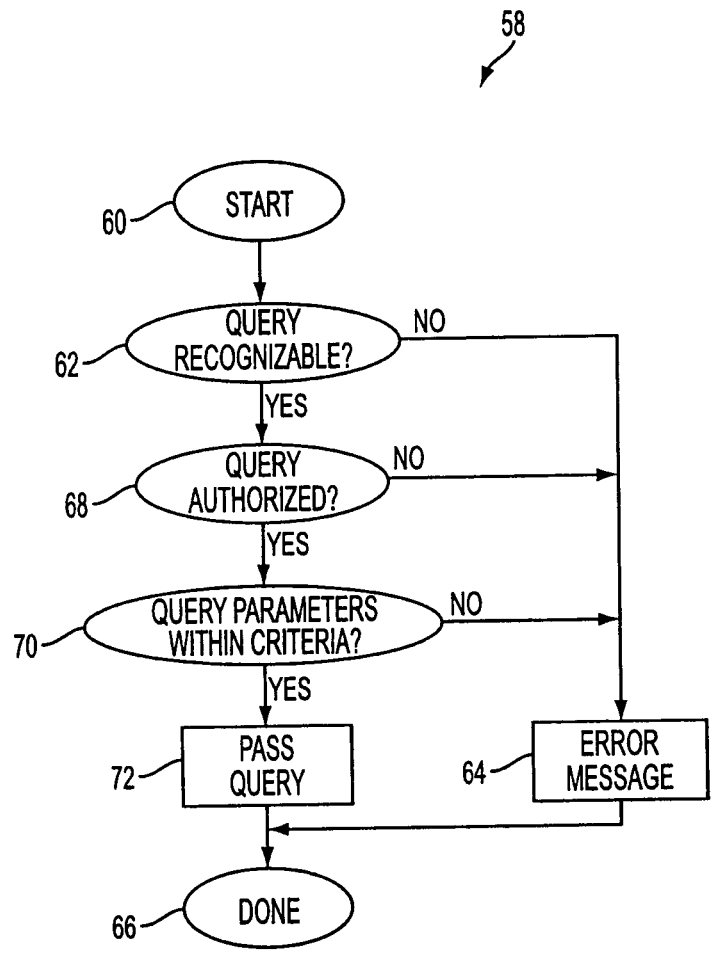
FIG. 5 is a flow diagram illustrating a process implemented by a general server by which a query is examined before it is passed forward to an appliance server.

FIG. 5 is a flowchart illustrating a process by which a query is examined before being forwarded to a subordinate server. It should be noted that the query could alternatively be an action to be forwarded to a subordinate server and, as such, the description for the handling of queries will server as a description of the handling of action. The process begins at 60 and, in a decision operation 62, the query is parsed and checked for correctness. That is, it is determined whether the query is recognizable. If not, an error message 64 is generated and the process 58 is complete at 66. If the query is recognizable, an operation 68 makes a determination whether the incoming query is authorized. To implement this operation, a server side cookie is preferably maintained including authentication information for each session. If the incoming session does not have proper authentication information in its server side cookie, it is considered unauthorized and an appropriate error message is produced in operation 64.

If the query is authorized, a determination is made regarding the content of the query itself (i.e. whether the query parameters are within a given criteria) in an operation 70. If, for example, it can be determined that the query would produce no results, then it is not forwarded to a subordinate server but rather an error message is generated by operation 64.

Operation 70 implies specific knowledge about the contents of the connected appliance servers. For example, if it is known that the connected appliance servers represent an old archive, and the query that is sent contains a time range that does not span the date range for the documents in the archive, then the request is "pruned" and an error message is produced. (It is common for there to be no criteria available to make such a determination, in which case, the request is not pruned.) If the query passes the various tests of operation 70, it is replicated and sent to all of the subordinate servers in a manner that provides for concurrent processing of the queries in the various subordinate appliance and general servers.

Note that the authentication information is preferably uniform throughout the hierarchy of servers. If, however, it is not, then alias lists may be maintained which establish a mapping for a given user name to a set of usernames and associated passwords that will be used when forwarding a request to the respective servers. Mapping techniques are well known to those skilled in the art.

Figure 6:
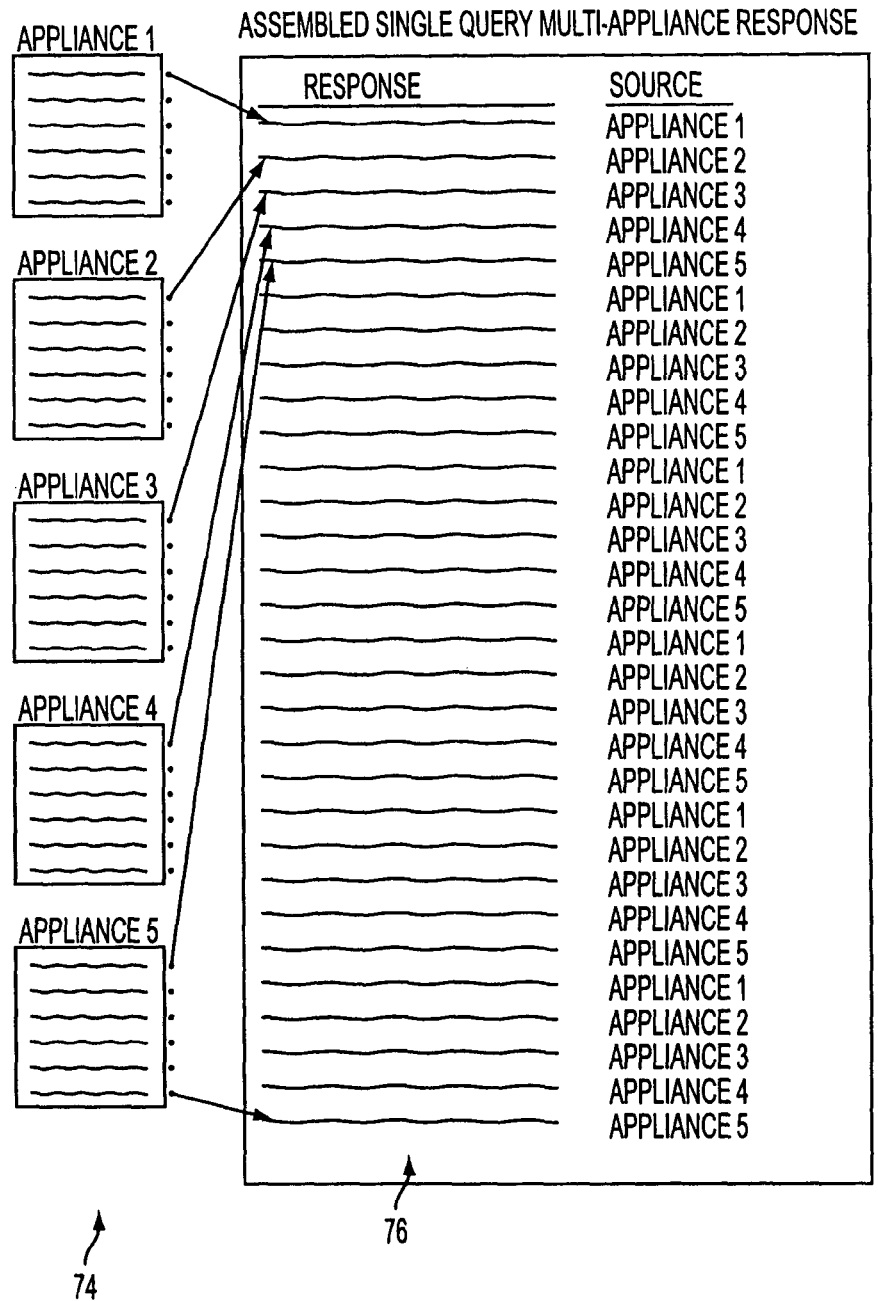
FIG. 6 illustrates a shuffled order presentation of data from multiple appliance servers.

In FIG. 6, a mapping of data from multiple result sets into a single response is illustrated. When processing a query, a user expects to receive a set of records as a result. Using the present invention, a single query can result in multiple result sets. Thus, it is necessary to provide a process by which these various result sets can be merged and presented to the user. The present invention incorporates a mapping function that allows the user to view the multiple result sets as a single result set. The mapping function must provide the illusion that there is a single result set that is navigable by the user.

With continuing reference to FIG. 6, multiple response lists 74 from multiple appliance servers are combined into a single response list 76. This particular mapping algorithm (described below in greater detail) creates an interleaved data set. That is, it takes the first response from the first appliance server, then the first response from the second appliance server, etc. until the first response from each of the servers 74 has been added to the list 76, and then the process is continued with the second response from each of the servers, the third response, etc. It will be appreciate by those skilled in the art that other forms of mapping can also be utilized without departing from the spirit of the present invention.

If the query received from the user contains an indication that the results are to be sorted by a specified field, then the mapping function preferably provides a sorting algorithm which generates a set of pointers that map virtual record numbers as seen by the user to be mapped to tuples containing physical record number and machine name. These tuples are sorted by comparing them against one another by accessing the associated data for the records. The comparator function in the sort is used repeatedly until the tuples are in the proper order for the end user. When it is necessary to present a record to the user as specified by an integer record number, the tuple for that record number is looked up in an array and the associated physical record number and machine name corresponding to one of the appliance server result sets is obtained. The desired record can then be accessed.

Since the number of records returned in a result set can very large, it may take a long time for the tuples to be sorted. It is therefore preferable that the sorting process take place concurrently with the user's perusal of the sorted result. As long as the user accesses portions of the result set for which the sorted tuples are ready, his access proceeds smoothly. If the user attempts to access a portion of the result set which does not yet have sorted tuples, then his request is blocked until the required tuples are ready.

This approach is possible because the result sets of the underlying appliance servers are sorted by the same field that is being sorted in the present mapping function. The algorithm merely examines the first record of each result set and determines which one should appear first to the user. The winning tuple is recorded in an array. It then advances a counter for that result set which points to the next record in the set and continues. Next, each result set is examined to determine which one has the next winning tuple. The next winning tuple is recorded in the array and so on. This kind of sort algorithm is well known to those skilled in the art, and is discussed in the writings of Knuth and others.

The size of the tuple array may be prohibitive if there are very large result sets. Therefore, it is preferable to quantize the result set being presented to the user into "pages" of fixed size. Starting points are recorded for each page which record the aforementioned counters for each appliance server result set. Thereafter, when it is necessary to present a specified record to the user, the record number is converted to a page number using division by the fixed page size, and the remainder is used for a position within the page. An LRU (least recently used) scheme is used to keep recently accessed portions of the tuple array in ready storage. Other portions are reconstructed as needed by using the starting point information and reapplying the aforementioned sort algorithm for the desired page.

In an alternative embodiment, a convergence algorithm is applied to provide random access to the entire result set without the slow process of sorting sequentially from the beginning. In this embodiment, the highest and lowest records in the sorted appliance server result sets are accessed. The value of the sort field is compared for these records to produce absolute high and low bounds for that sorted field. The algorithm then proceeds to determine a value for the sort field which acts as a dividing line. The number of records that precede this value in the sorted order must be exactly equal to the zero based desired record number. To find this dividing line, an initial guess is taken at the halfway point between the minimum and maximum values of the sorted field. Queries are made to each appliance server to determine how many records match the original query with the additional constraint that the records precede the guess value of the dividing line with respect to the sorted order. The number of records that match is returned from each appliance and the total is taken. If the total is less than the desired zero based record number, then the guess is increased to approach the sort order upper bound. This is accomplished by adding half of the difference between the guess and the upper bound. Likewise, if the number of records that match is too high, then the guess is adjusted to approach the lower bound in like manner. When the algorithm converges on the proper number of preceding records, then a query is made to find the records that come after the dividing line. Out of all of the result sets that are returned, the one with the sort field value that is closest to the lower bound of the sort order is used. A refinement to this algorithm uses an initial guess that is proportional within the upper and lower bounds of the sort value to the desired record number within the total number of records. Another refinement to this algorithm eliminates the need for a final query after the dividing line is found. This is accomplished by adjusting the algorithm to use the included set of records rather than the excluded set while converging. Once the dividing line is found for the first desired record, the subsequent records can be obtained by using the aforementioned sequential method.

In a third embodiment of the mapping function, records are not sorted at all but rather they are "shuffled" or "interleaved." This method is used when the user does not specify a sort order. The reason the results are shuffled is so that the user sees results from a plurality of appliance servers on each page. If the user had desired to see homogenous results from one appliance server at a time, he would have little need for the present invention. The shuffling algorithm is strictly mathematical and uses the number of records from each of the result sets from the appliance servers to construct a mathematical mapping between record numbers in user space and record numbers and machine names in appliance server space. Given a record number in user space, a calculation is made to convert it to a machine name and record number. This calculation is based on the number of records returned by each of the appliance servers.

As noted above, the shuffled order is shown in the list 76 of FIG. 6. One important fact to note is that the various appliance servers will usually produce a different number of records. This implies that the shuffle "frequency" changes when one of the result sets is exhausted.

Figure 7A:
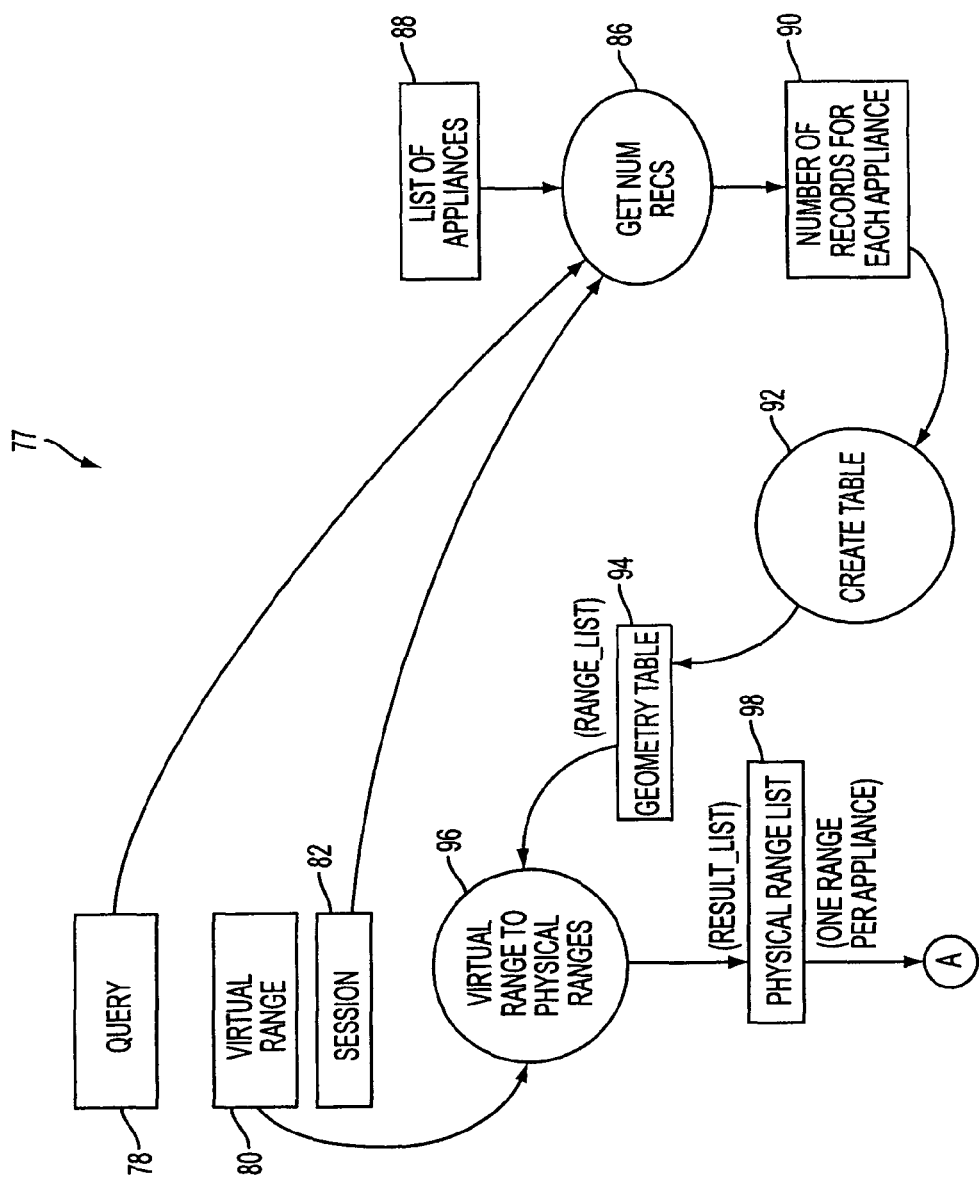
FIGS. 7a and 7b illustrate a process implemented by a general server by which an incoming query, virtual range, and session are processed to produce a desired page.
Figure 7B:
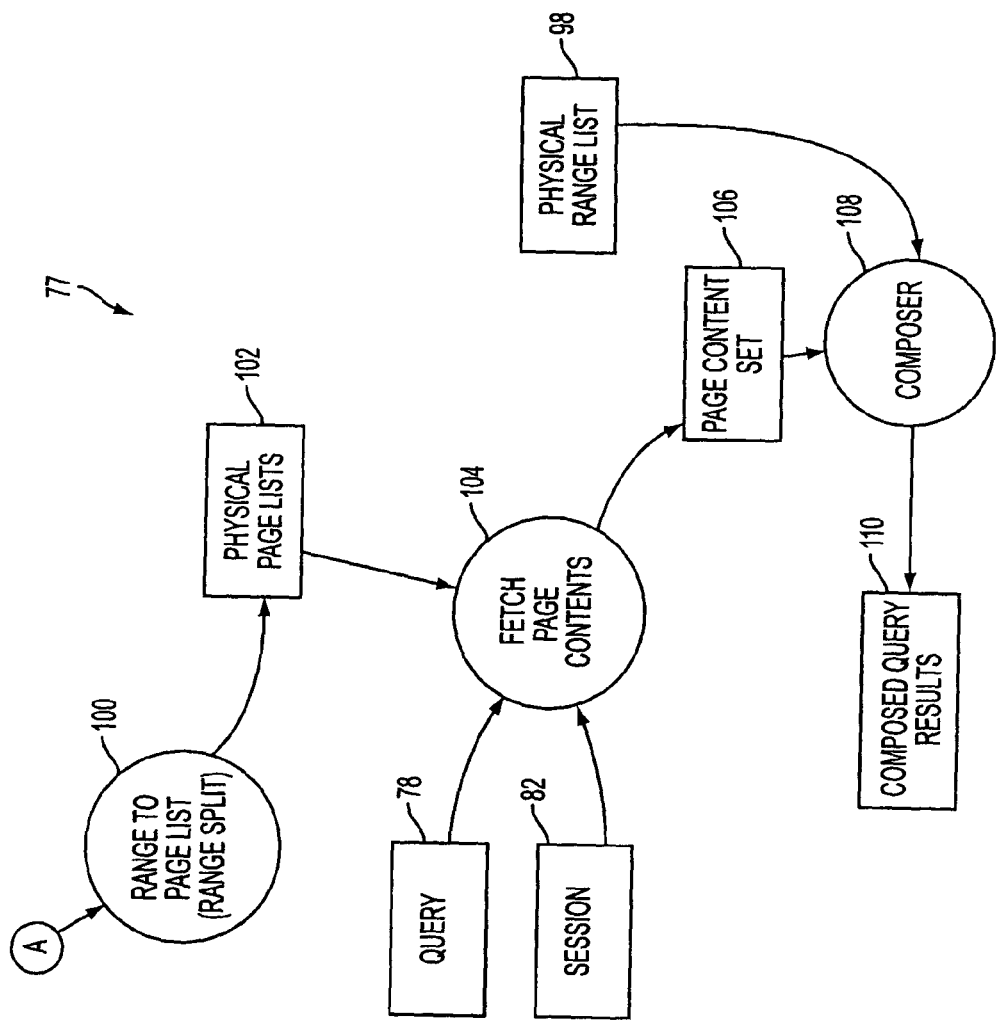

The combination of FIGS. 7a and 7b show the overall process 77 by which an incoming query 78, virtual range 80 and session 82 are processed to produce a desired page defined by the composed query results 84. Process 77 uses a paging algorithm to keep a cache of pages from subordinate appliance servers (including general servers). That is, when a query 78 is received, a desired range of records 80 is also received, as well as a session 82. A session contains information concerning the type of browser being used, the user identity, etc.

As illustrated in FIGS. 7a and 7b, a process 86 uses the query 78 and session 82 to query a number of subordinate appliances as determined by a list 88 of appliance servers, and develops a cumulative sum of the records generated by the queries to the appliance servers. That is, process 86 obtains a single integer from each directly subordinate server (appliance or general) and creates an array of integers representing the number of records for each corresponding directly subordinate server, as shown at 90.

In a process 92, a geometry table 94 is created from the number of records 90 for each directly subordinate appliance server (including general servers). A geometry table 94 is a mathematical derivative of an array which describes the mapping required to produce a desired shuffled order, while preserving the ability to randomly access records within the shuffled order. Algorithms implementing the geometry table will be discussed below.

In a process 96, virtual ranges are converted to physical ranges. Process 96 utilizes the geometry table 94 and the virtual range 80 to produce a physical range list 98. This physical range list 98 contains one range of physical records for each appliance server. The specified range for a given appliance corresponds to the records required from that appliance to produce a shuffled output.

In a process 100, the ranges are converted into page lists 102. That is, the process 100 produces one page list per subordinate server. By obtaining a page at a time from the subordinate servers, a form of caching is accomplished, allowing quick access to proximate data, as will be appreciated to those skilled in the art. This process 100 supports this paging methodology.

In a process 104, page contents are "fetched." That is, process 104 has, as inputs, the query 78, the session 82, and the physical page lists 102, and produces a page content set 106, which comprises the actual data, i.e. the cached pages, responsive to the query. A composer process 108 takes the page content set 106 and the physical range list 98 to create a composed query results output 110. An example of the composed query results 110 comprises the list 76 of FIG. 6.

FIGS. 8a-8d collectively are a flowchart used to explain in greater detail how to create a table of information that defines the mapping, i.e. the create table operation 92 of FIG. 7a. Briefly, there is an entry in the table for each run of records that has a homogenous frequency. The entries in the table mark the transition points when the frequency changes, and supply information about what section of the user record space that is represented by that entry. Also, which appliance servers are to be used for that section are enumerated.

Figure 8A:
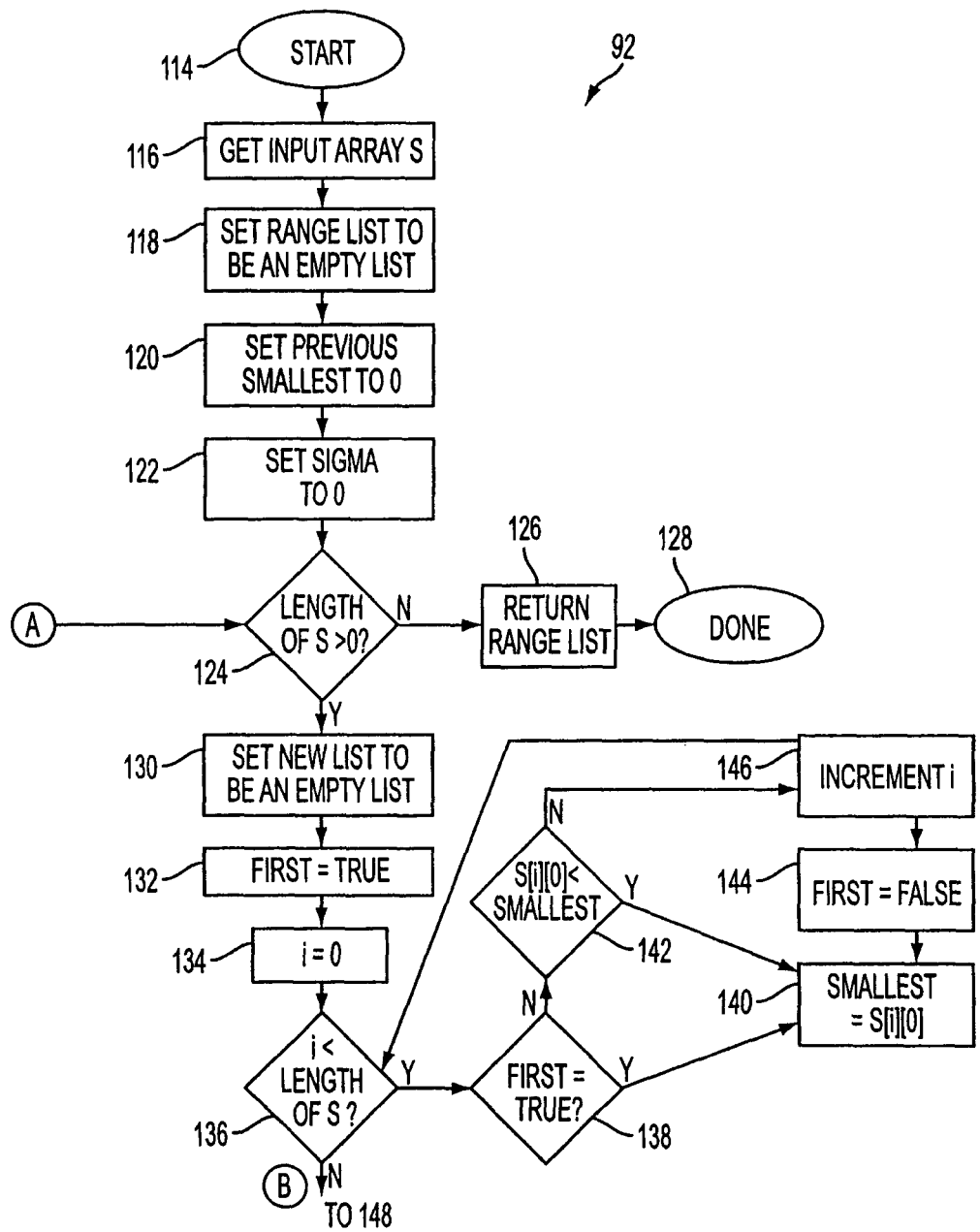
FIGS. 8a-8d are flow diagrams illustrating a process implemented by a general server for creating a table of information that defines a mapping between data available from the appliance servers with respect to a given query and the data presented to a user.
Figure 8B:
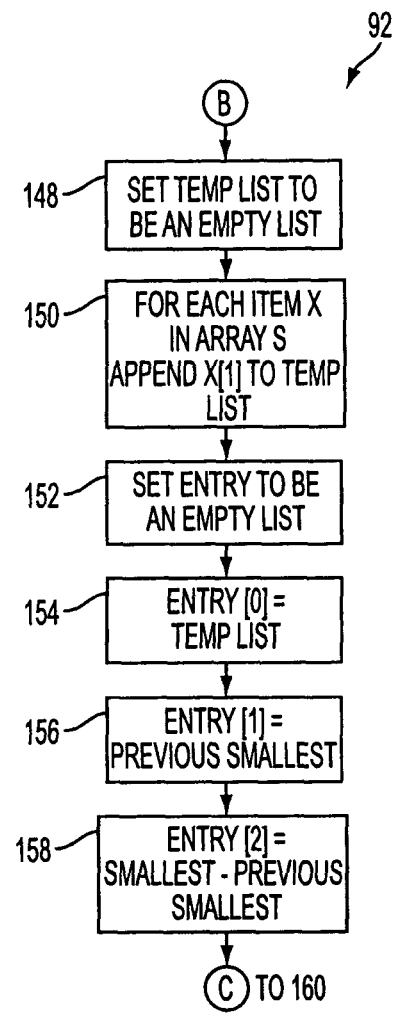
Figure 8C:
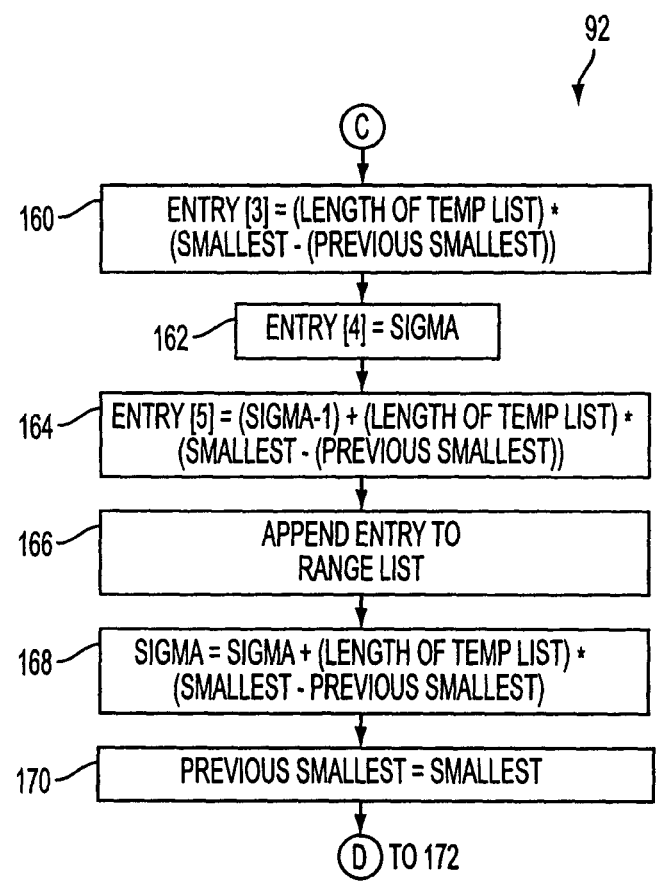

More specifically, and beginning with FIG. 8a, a method 92 for creating a table of information that defines the mapping begins at 114 and, in an operation 116, the input array "S" is retrieved. For each appliance server or subordinate general server, the array S stores the number of records corresponding to a give query available on that server. In the present embodiment, S is a two-dimensional array, where the first dimension is an index defining each server. The second dimension has two states: 0 for the number of records on that server corresponding to a given query, and 1 for identification information about the server. Next, in an operation 118, a list range_list is cleared to create an empty or null list. Operation 120 sets the variable previous_smallest to zero, and operation 122 sets the variable sigma to zero.

Arrays and lists are well known to those skilled in the art. As is also well known to those skilled in the art, some computer systems allow for hybrid data structures implementing the characteristics of both arrays and lists. For example, the Java® programming language allows for vectors which have the characteristics of both arrays and lists. In a preferred embodiment of the present invention, the arrays and lists are implemented as Java vectors, but are still referred to as arrays and lists, respectively, going to their primary characteristics and uses.

A decision operation 124 determines whether the length of the array S is greater than zero, i.e. if there is at least one server represented by the array. If it is not, an operation 126 returns the list range_list and the process 122 is completed at 128. It is this range_list returned by operation 126 that is the geometry table 94 of FIG. 7a. If the length of the array S is greater than zero, then operation 130 sets a list new_list to be an empty or null list. An operation 132 then sets a flag "first" to be true, and an operation 134 sets an integer variable i to zero.

Next, the process 112 enters a loop as long as the variable i is less than the length of the array S, i.e. is less than the number of servers represented in the array. That is, if the variable i is less than the length of the array S as determined by operation 136, an operation 138 determines if the flag "first" is true. If so, an operation 140 sets the variable "smallest" equal to the value of S[i][0] (i.e. the value of the array S element having coefficients {i,0}, which is the number of records responsive to a query for a server i). If first is not true, then operation 142 determines whether S[i][0] is less than the value of the variable "smallest." If so, then operation 140 sets smallest to that value, and operation 144 sets the flag "first" to false. Then, operation 146 increments the variable "i" by one after either the conclusion of operation 144 or upon a negative determination by operation 142. Process control is then returned to operation 136.

If operation 136 determines that i is not less than the length of the array S, an operation 148 (FIG. 8b) sets a list temp_list to be and empty or null list. The list temp_list is used to contain the number of records for each server in the arrays S. This process is started in an operation 150, for each item "x" in the array S, x[1] is appended to the temp_list. In operation 152, the list "entry" is set to be an empty or null list. The list entry is used to store a series of computations, as explained below. In an operation 154, the value of entry[0] is set to be the temp_list. Operation 156 sets entry[1] to the previous_smallest value, and operation 158 sets entry[2] to the difference between the value of the variable "smallest" value and value of the variable previous_smallest. This difference represents the number of rows that conform to a homogeneous interleave frequency.

The interleave frequency is related to the number of servers which have records to be interleaved. As servers with fewer records responsive to a query drop out, the interleave frequency changes. For example, if there are 3 servers, a first of which had 10 records responsive to a query, a second of which had 20 records responsive to query, and a third of which had 100 records responsive to the query, there would be a first frequency for the first 30 records that were interleaved, and a second frequency for the next 20 records interleaved, and a third frequency for the final 80 records retrieved from the third server.

Operation 160 (FIG. 8c) calculates the value of entry[3] as follows:

$$\text{entry}[3]=(\text{length of temp\_list})*(\text{smallest}-(\text{previous smallest})) \quad \text{formula 1}$$

This formula 1 gives the total number of interleaved records represented by this homogenous region (i.e. this constant frequency region) of the interleaved data.

Then operation 162 sets entry[4] to sigma, which is the total number of records that had been previously processed in all previous homogenous regions. Operation 164 calculates entry[5] as follows:

$$\text{entry}[5]=(\text{sigma}-1)+(\text{length of templist})*(\text{smallest}-\text{previous\_smallest}) \quad \text{formula 2}$$

Formula 2 calculates the absolute index of the final record in the current homogenous region, and stores this result in entry [5].

Operation 166 appends the list entry to the list rangelist, and operation 168 recalculates calculates sigma as follows:

$$\text{sigma}=\text{sigma}+(\text{length of temp\_list})*(\text{smallest}-\text{previous\_smallest}) \quad \text{formula 3}$$

Next, operation 170 sets the value of previous_smallest to the current value of smallest.

Figure 8D:
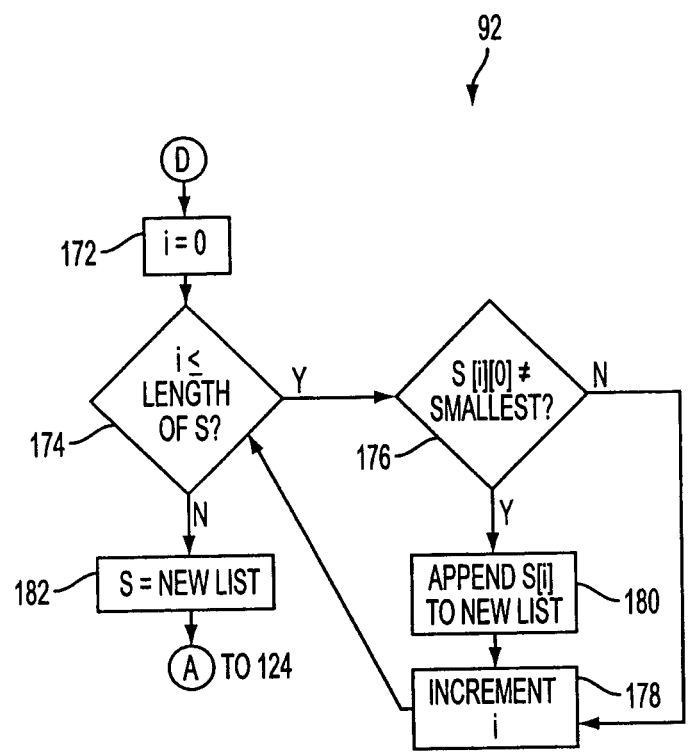

As seen in FIG. 8d, after operation 170 is completed, an operation 172 sets the integer variable "i" to zero. Next, a decision operation 174 determines whether the variable i is less than or equal to the length of the array S, i.e. less than or equal to the number of servers represented by the array S. If it is, a decision operation 176 determines whether S[i][0] is not the smallest. If it is equal to the smallest, an operation 178 increments the variable i by 1. If it is not equal to the smallest, then S[i] is appended to the list new_list by operation 180, after which operation 178 increments i. Process control is then returned to decision operation 174. If i is greater than the length of S, then operation 182 sets the array S to the list new_list, and process control returns to operation 124 of FIG. 8a. In this instance, the array S is acting as a list, as described above.

FIGS. 9 through 16 explain the process by which the virtual range of records obtained from the user's query is converted into physical range specifications for the appropriate appliance servers.

FIGS. 9a-9d collectively comprise a flow diagram illustrating the operation 96 of FIG. 7a for mapping virtual ranges to physical ranges. Generally speaking, FIG. 9 is a process for going through the geometry table and determining which portions of the interleaved homogenous sections of physical ranges from the appliances pertain to the virtual range.

Figure 9A:
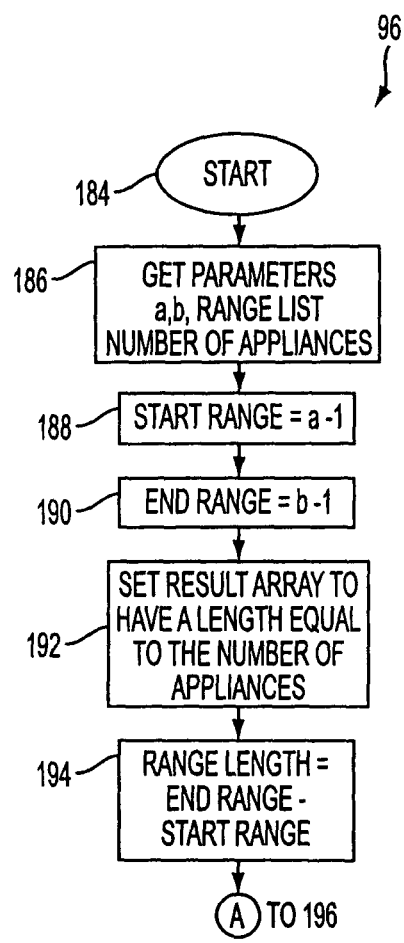

In FIG. 9a, the process begins at 184 and, in an operation 186, parameters a, b, range_list, and the number of appliances is retrieved. The parameter a is the first required record in the virtual range, and the parameter b is the last required record in the virtual range. An operation 188 sets the variable start_range to a-1, and an operation 190 sets the variable end_range to b-1. Operation 192 sets the result array to have a length equal to the number of appliances, and the variable range_length is set to the difference between the end_range and the start_range in an operation 194.

Figure 9B:
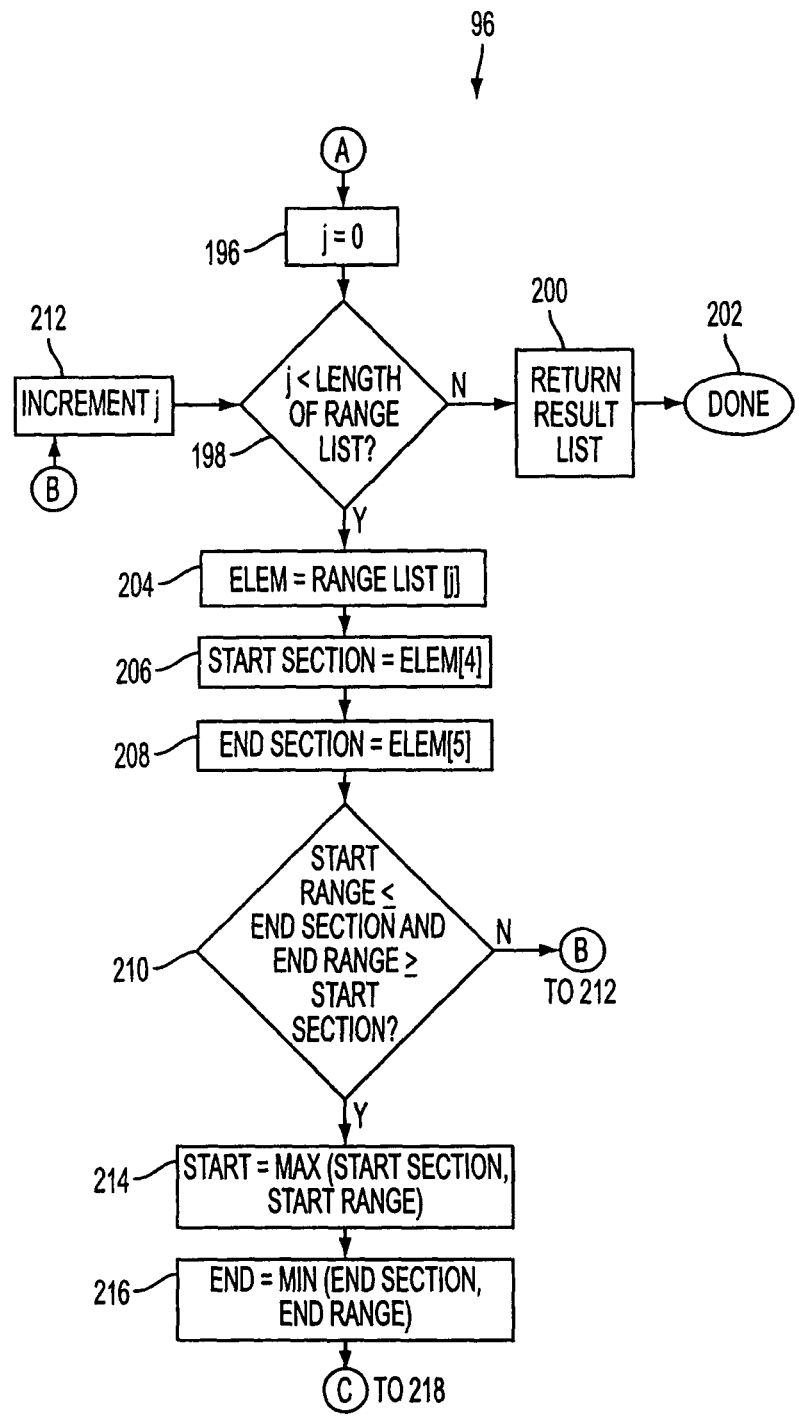

In FIG. 9b, after the completion of operation 194 (FIG. 9a), the variable j is set to zero in an operation 196. A decision operation 198 determines whether the variable j is less than the length of the range_list. If so, operation 200 returns the result_list, and the process 96 is completed at 202. This result_list corresponds to the physical range list 98 of FIG. 7a.

If j is less than the length of the range_list, an operation 204 sets the lists "elem" range_list[j]. Operations 206 and 208 set the variables start_section to the value of elem[4] and end section to the value elem[5], respectively. These values come from the geometry table 94 of FIG. 7a.

Next, an operation 210 determines whether the start_range is less than or equal to end_section and whether end_range is greater or equal to start_section. If not, then the variable j is incremented by one in an operation 212, and process control returns to operation 198, described previously. Otherwise, operation 214 sets the variable start to the greater (maximum) of the variables start_section and start_range. Operation 216 sets the variable end to the lesser (minimum) of the variables end_section and end_range.

Figure 9C:
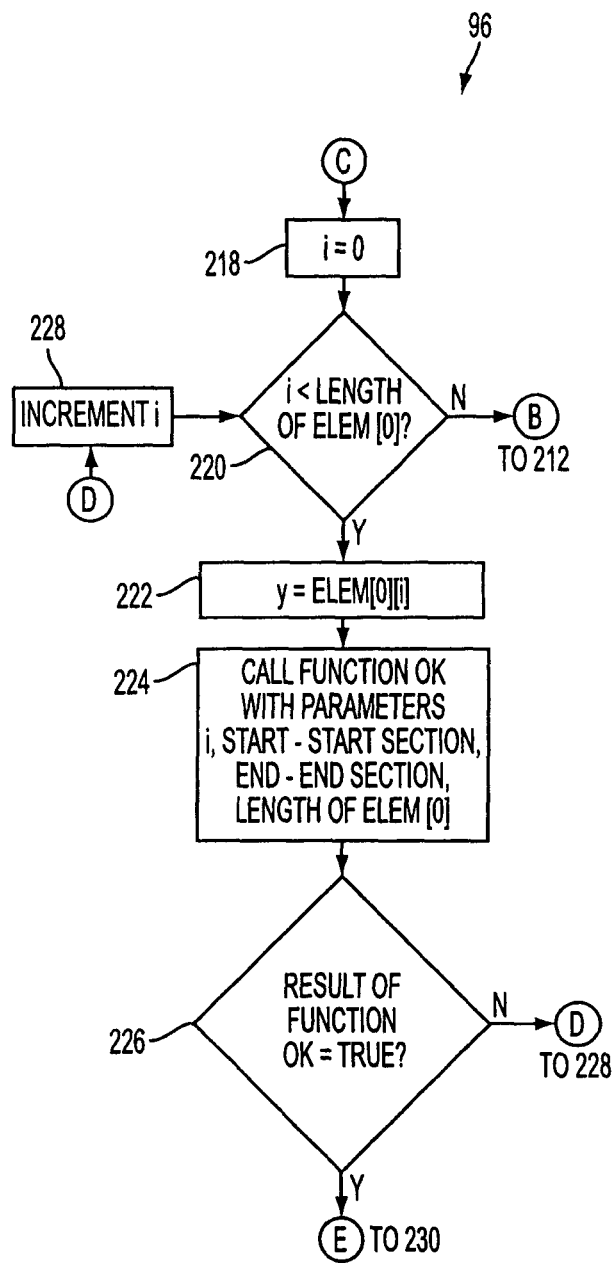

In FIG. 9c, after the completion of operation 216 (FIG. 9b), the variable i is set to zero in an operation 218. Then, a decision operation 220 determines whether the variable is less than the length of elem[0]. If not, control returns to operation 212 (FIG. 9b). Otherwise, operation 222 sets the variable "y" to elem[0][i]. Next, an operation 224 calls a function "OK", which is explained in greater detail with reference to FIG. 10, by passing the parameters i, the difference between start and start_section, the difference between end and end_section, and length of elem[0]. A decision operation 226 then determines if the result of the function OK is "true." If not, the variable i is incremented in an operation 228, and then control is returned to operation 220, described previously. Otherwise, control is passed to operation 230 (FIG. 9d).

Figure 9D:
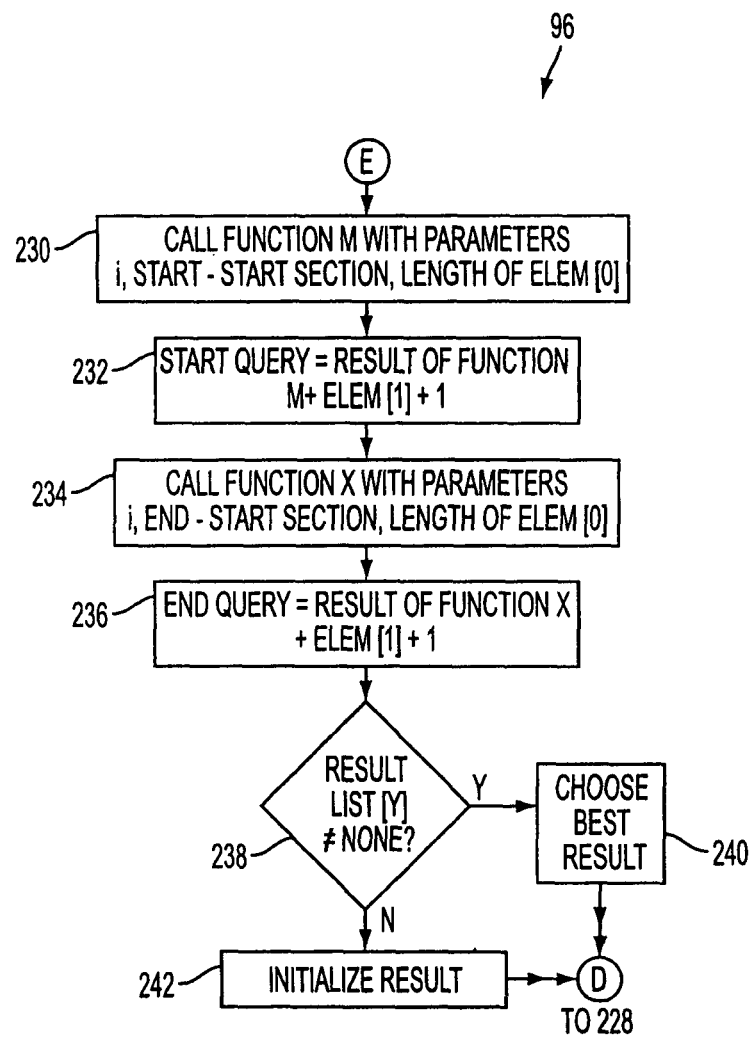

In FIG. 9d, operation 230 calls the function "m" with the parameters i, the difference between start and start_section, and length of elem[0]. The function m will be described in greater detail with respect to FIG. 11. Then, in an operation 232, the variable start_query is set to the result of function m plus elem[1] plus 1.

An operation 234 calls a function "x" with the parameters i, the difference between end and start_section, and the length of elem[0]. Function x will be described in greater detail with respect to FIG. 12. Operation 236 sets the variable end_query to the result of the function x plus elem[1] plus 1.

Next, a decision operation 238 determines whether the result_list[y] is not equal to none or "null." If so, the best result is chosen in an operation 240 and, if not, the result is initialized in an operation 242. After the completion of either operation 240 or 242, process control is returned to operation 228 (FIG. 9c).

Figure 10:
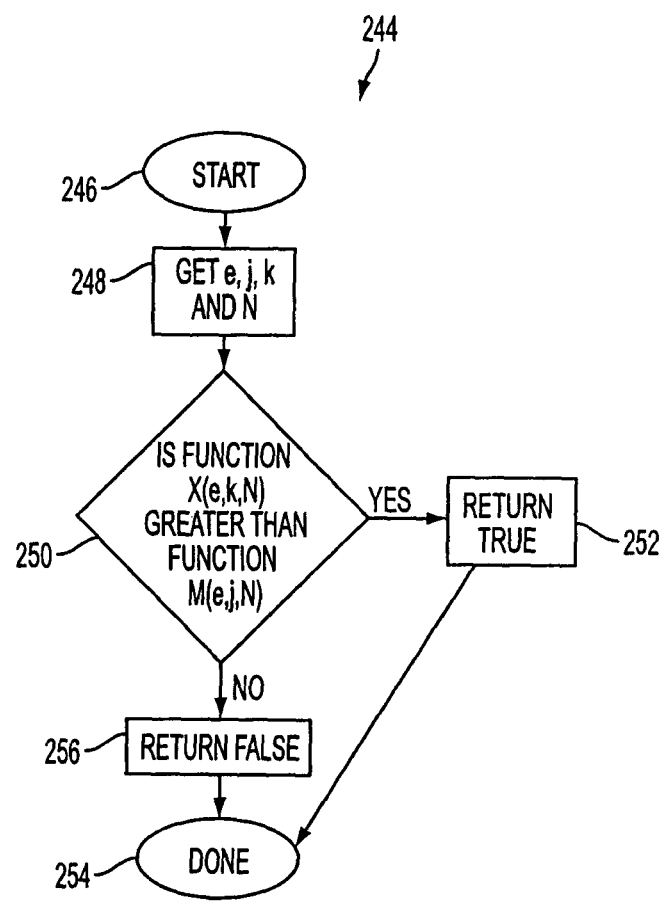
FIG. 10 is a flow diagram illustrating the function "OK" of FIG. 9c.

FIG. 10 illustrates a process 244 for providing the aforementioned function "OK."

Process 244 begins at 246 by being "called" by an operation, such as operation 224 of FIG. 9c, and an operation 248 retrieves the values of the variables e, j, k, and n. Next, a decision operation determines whether resultant of a function x(e,k,n) is greater than a resultant of a function m(e,j,n). Again, function x is described with reference to FIG. 12, and function m is described with reference to FIG. 11. If the result of the operation 250 is true, an operation 252 returns the flag "true", and the process 244 is completed at 254. Otherwise, an operation 256 returns the flag "false", and the process 244 is completed at 254.

Figure 11:
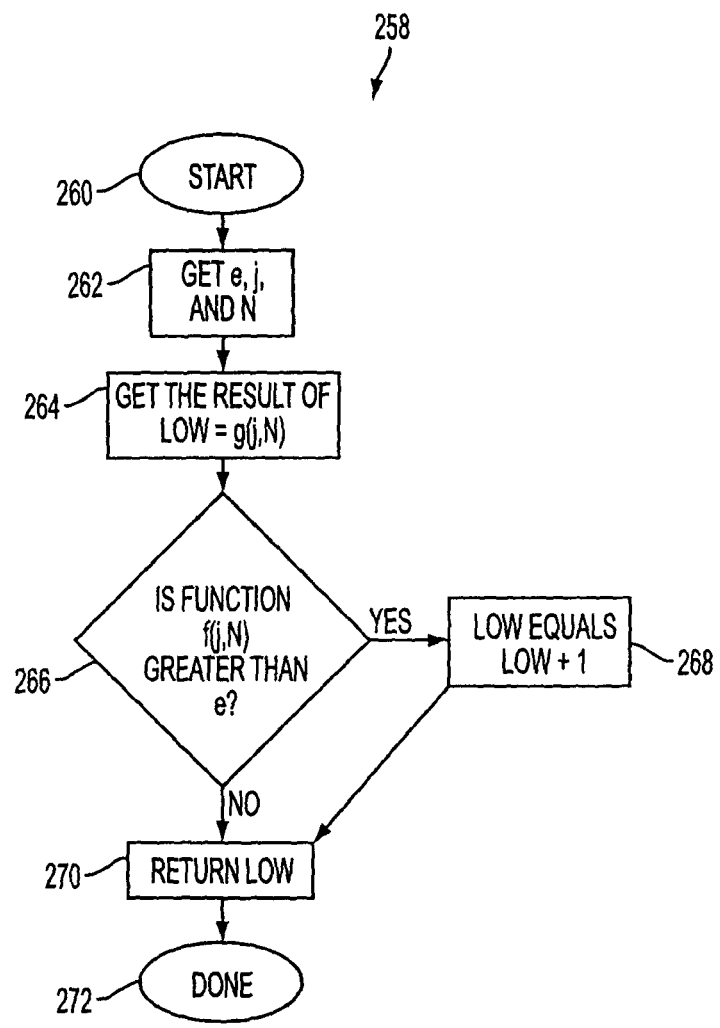
FIG. 11 is a flow diagram illustrating a function "M" of FIG. 10.

FIG. 11 illustrates a process 258 for providing the function "m." The process 258 begins at 260 by being called by an operation (such as operation 250 of FIG. 10), and an operation 262 retrieves the values of the variables e, j, and n. An operation 264 calls a function "g" (described with reference to FIG. 13) and assigns the resultant of the function call g(j,n) to the variable "low." An operation f(j,n) is called by operation 266, and it is determined if f(j,n) is greater than e. (Function f is described in greater detail in FIG. 14) If so, low is incremented by 1 in an operation 268, and is returned to the operation calling the function m in an operation 270, and the process 258 is complete at 272. Otherwise, operation 270 returns the value of low in operation 270 without it being incremented.

Figure 12:
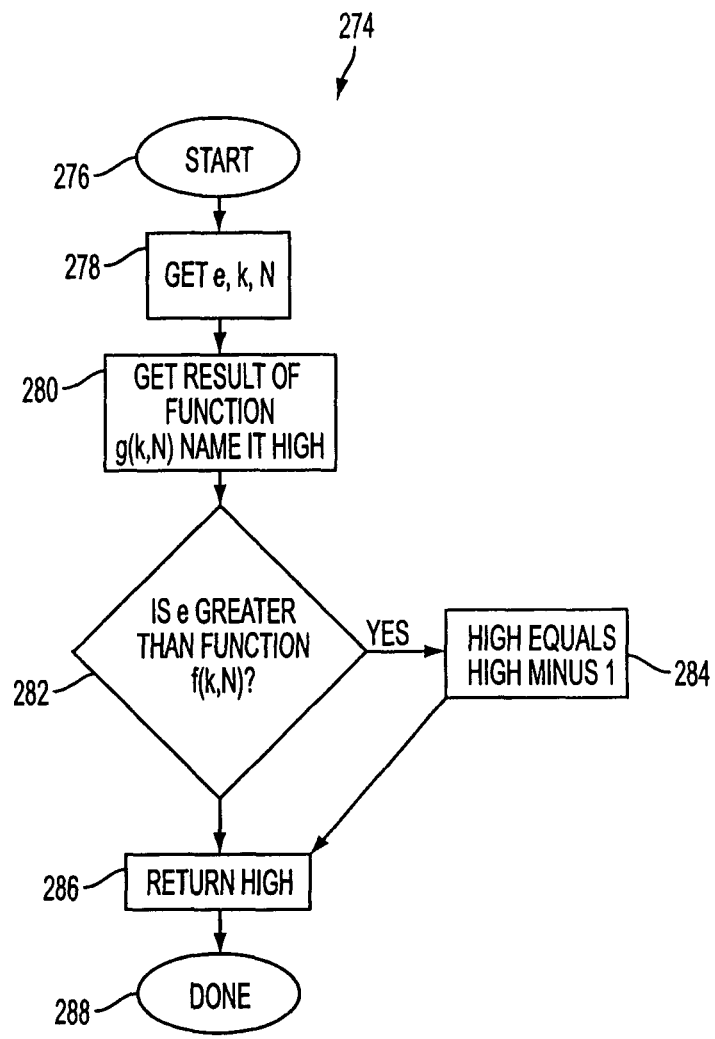
FIG. 12 is a flow diagram illustrating a function "X" of FIG. 10.

FIG. 12 illustrates a process 274 for the function "x." The process begins at 276 and, in an operation 278, the variables e, k, and n are retrieved. Next, in an operation 280, the function "g" (see FIG. 13) is called, and the resultant of g(k,n) is stored in the variable "high." Next, operation 282 calls function f (see FIG. 14) and determines if the value of variable e is greater than the result of the function f(k,n) and, if so, operation 284 decrements the variable high by 1. The variable high is then returned in operation 282, and the process 274 is complete at 288. Otherwise, operation 286 returns the value of high without it being decremented.

Figure 13:
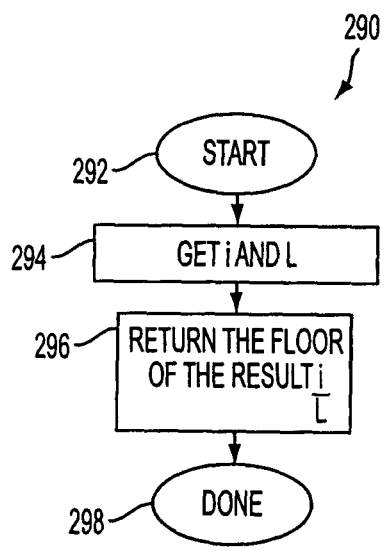
FIG. 13 is a flow diagram illustrating a function "G" of FIGS. 11 and 12.

FIG. 13 illustrates a process 290 for performing the function "g." The process 290 begins at 292 and, in an operation 294, the values of the variables i and L are retrieved. Then, in an operation 296, the "floor" of the result of i/L is returned, and the process 290 is complete at 298. As will be appreciated by those skilled in the art, the "floor" of a number is the next integer in the direction of negative infinity. That is, for positive integers, the fractional component of the number is dropped, similar to the "chop" function.

Figure 14:
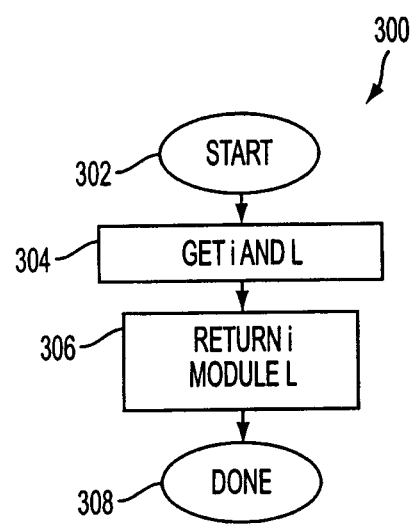
FIG. 14 is a flow diagram illustrating a function "F" of FIGS. 11 and 12.

FIG. 14 illustrates a process 300 for performing the function "f." The process 300 begins at 302 and, in an operation 304, the values of the variables i and L are retrieved. An operation 306 returns the variable i and the modulo of L. As is well known to those, skilled in the art, the modulo of a number is the remainder of a the division. For example, if i=5 and L=3, then the modulo of i/L=2, i.e. the remainder of the division of 5/3. The process 300 is then complete at 308.

Figure 15:
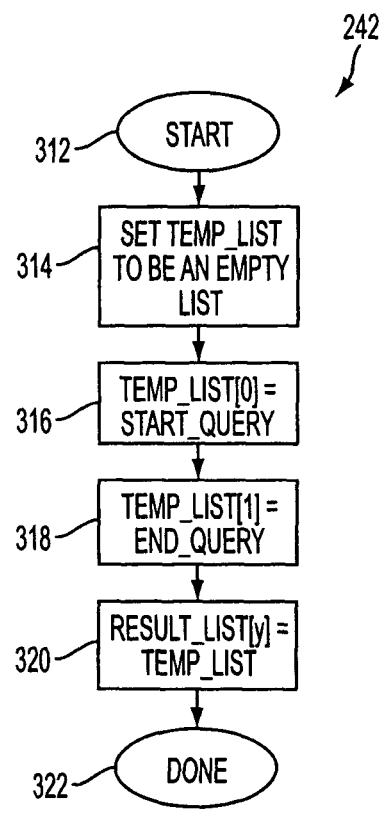
FIG. 15 is a flow diagram illustrating the process of initializing the result of FIG. 9d.

FIG. 15 illustrates in greater detail a process 242 of FIG. 9d for initializing the list result_list. Process 310 begins at 312 and, in an operation 314, the temp_list is initialized as an empty list. Next, in an operation 316, temp_list[0] is set to the value of start_query and, in an operation 318, temp_list[1] is set to the value of end_query. Operation 320 sets the list result_list [y] to the list temp_list, and the process 310 is completed at 322.

Figure 16:
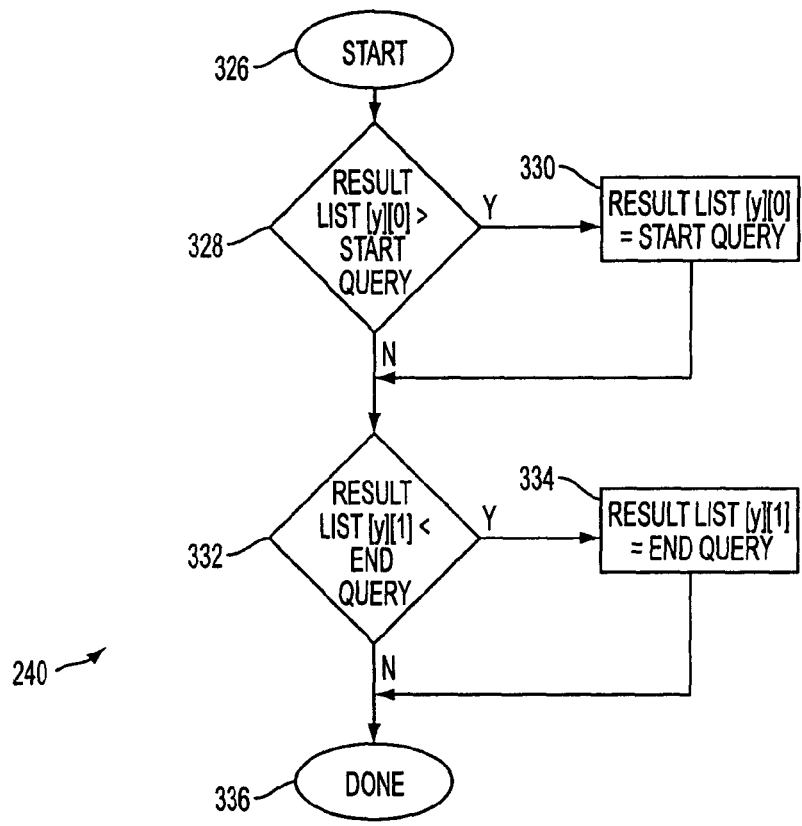
FIG. 16 is a flow diagram illustrating the process of choosing best result of FIG. 9d.

FIG. 16 illustrates in greater detail the process 240 of FIG. 9d for choosing the best result. The process begins at 326 and, in an operation 328, it is determined whether the result list [y][0] is greater than the value of the variable start_query. If so, operation sets the value of result list[y][0] to start_query in an operation 330. If not, or after operation 330 is completed, a decision operation 332 determines whether the result list[y][1] is less than the value of the variable end_query. If so, operation 334 sets the value of result_list[y][1] to the value of end_query. If not, or after operation 334, the process 324 is completed at 336.

Figure 17:
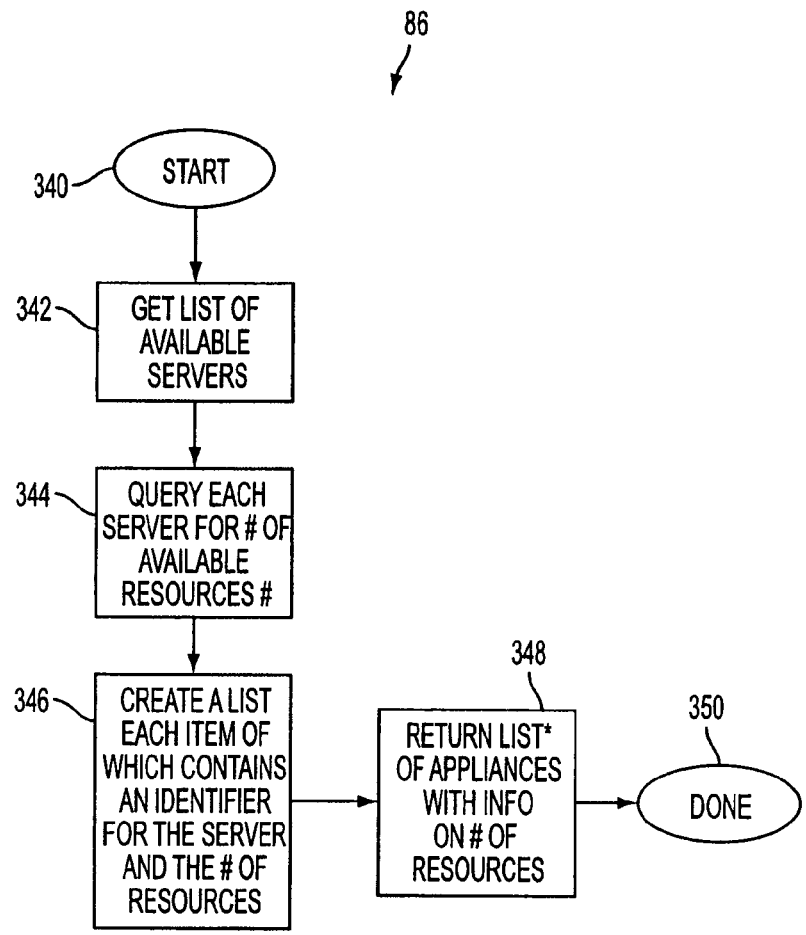
FIG. 17 is a flow diagram illustrating a process implemented by a general server by which a list of the number of records can be obtained using a sequential method.
Figure 18:
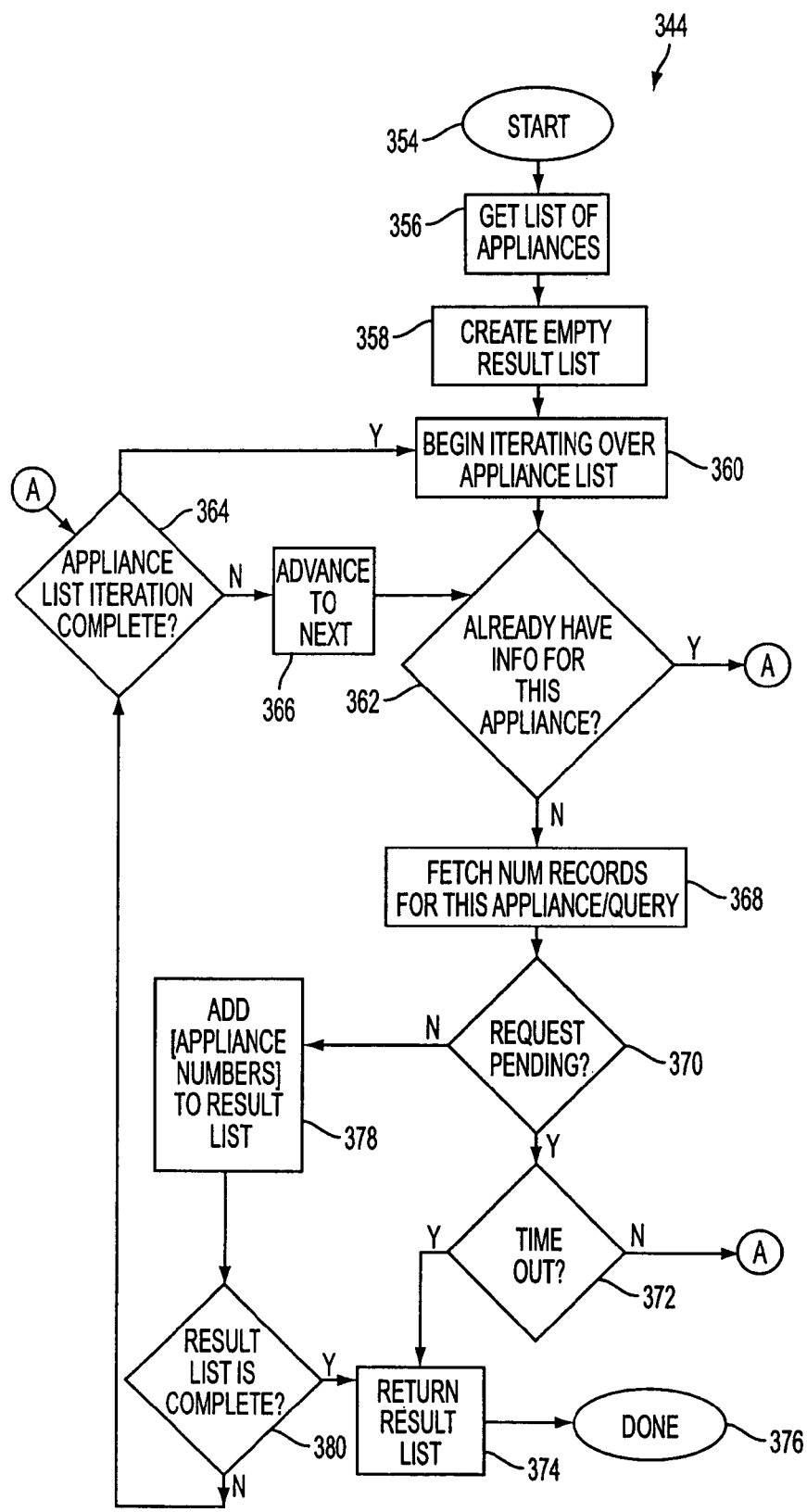
FIG. 18 is a flow diagram illustrating a process for obtaining the number of records for each appliance in FIG. 17.

FIG. 17 illustrates the process 86 "get num recs" for creating an appliance list in greater detail. FIG. 17 shows the process by which a list of the number of records which match the user's query is obtained from the appliance servers. FIG. 18, to be discussed subsequently, shows this process in more detail.

The process begins at 340 and, in an operation 342, a list of available servers on the network system is retrieved. This can either be a stored value, or the servers could be discovered on the network by techniques well known to those skilled in the art. Next, in an operation 344, each of the servers is queried for the number of its available resources. Typically, these resources are records, but can also comprise other resources such as pictures files, video files, audio files, spread sheets, etc. Operation 346 creates a list of each item which contains an identifier for the server, and the number of resources. Operation 348 returns a list of appliances with information on the number of resources or records available on the network. Process 338 is then complete at 350.

FIG. 18 illustrates in greater detail the process 344 of FIG. 17 for obtaining a number of records for each server (appliance or general server). The process begins at 354 and, in an operation 356, a list of servers referred to as appliance_list is obtained. Next, in an operation 358, an empty list results_list is created. Operation 360 goes to the beginning of the appliance_list.

A decision operation 362 determines if information on the current appliance (again, including subordinate appliance servers and subordinate general servers) is already available. If so, operation 364 determines if the appliance_list iteration is complete, i.e. if every appliance on the list has been analyzed. If not, operation 366 advances to the next appliance on the list, i.e. the appliance_list is iterated by one, and control is returned to operation 362. If the appliance_list iteration is complete as determined by operation 364, process control is returned to operation 360 to start again from the beginning of the appliance_list.

If operation 362 determines that information for the current appliance is not available, operation 368 fetches the number of records responding to a query for the current appliance and stores the result in num_recs. Operation 370 determines whether there is a request pending and, if so, an operation 372 determines whether a time-out period has passed. A typical time out period is dependent upon the response time that an operator is willing to tolerate, e.g. 10-20 seconds. If not, process control is returned to operation 364. If a time-out has occurred, an operation 374 returns the list result_list, and the process 352 is complete at 376.

If operation 370 determines that there is no request pending, an operation 378 adds the current appliance identification and the value of num_recs to the list result_list. If operation 380 determines that the result_list is complete, then control is turned over to operation 374 and the list result_list is returned to the calling function. Otherwise, operation 380 turns over control to operation 364 to iterate the list appliance_list by one position.

Figure 19:
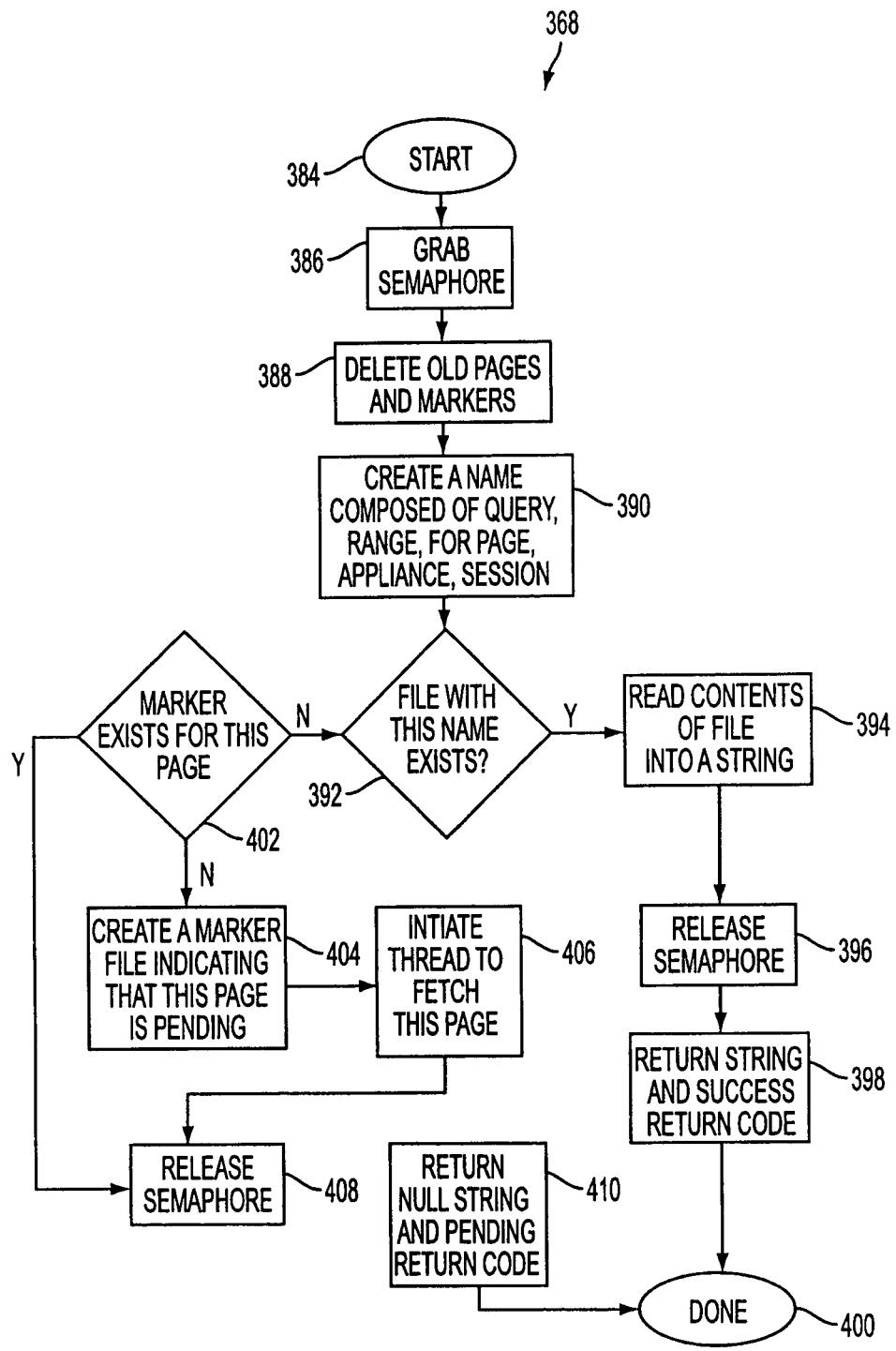
FIG. 19 is a flow diagram illustrating a process for getting a page in FIG. 18.

Briefly, FIG. 19 shows the process whereby a request for a page is processed. The requested page is looked up in the cache. If it is present, then it is returned. If it is not present, then a thread is initiated to fetch that page, and a return code of pending is returned to the caller. Thus, it is guaranteed to return very quickly. This technique is very helpful in that it allows the caller to implement concurrency very easily. Note that the cache scheme shown is disk based, and that a memory based embodiment is also contemplated, (preferably using hash tables to determine quickly whether a desired page is available.)

More specifically, FIG. 19 illustrates in greater detail the operation 368 of FIG. 18 for fetching the number of records (otherwise referred to "get page"). The process 368 begins at 384 and, in an operation 386, the semaphore is grabbed. A semaphore is an access arbitrator, and when it is grabbed by a particular function, no other function can access it. That is, there may be multiple threads that wish to access a particular function, but only the one thread that has the semaphore is allowed to access the function at that time. The operation 386 therefore only allows one thread of control to activate the process 386 at a time.

Operation 388 deletes old pages and markers, and operation 390 creates a name composed of query, range_for_page, appliance and session. This may be a hash table, since the query could be very long. Next, an operation 392 determines whether a file with the name created by operation 390 already exists. If so, operation 394 reads the contents of the file with that name into a string. Operation 396 releases the semaphore, allowing access by other threads, and operation 398 returns the string and success return code indicating a cache hit. The process 368 is then complete at 400.

If operation 392 determines that there is not a file with the name given by operation 390, a decision operation 402 determines if there is a marker for the current page. (A marker is an indicator file that the request has been sent and the resultant is still being awaited, and is a place holder for the actual data when it arrives.) If not, an operation 404 creates a marker file indicating that the current page is pending, and an operation 406 initiates a thread to fetch this page. Threads are well known to those skilled in the art. Parameters that are passed include query, range, appliance and session. Operation 408 then releases the semaphore, and operation 410 returns a null string and pending_return code, and the process 368 is complete at 400. If operation 402 determines that there was a marker for this page, operation control is given directly to operation 408.

Figure 20:
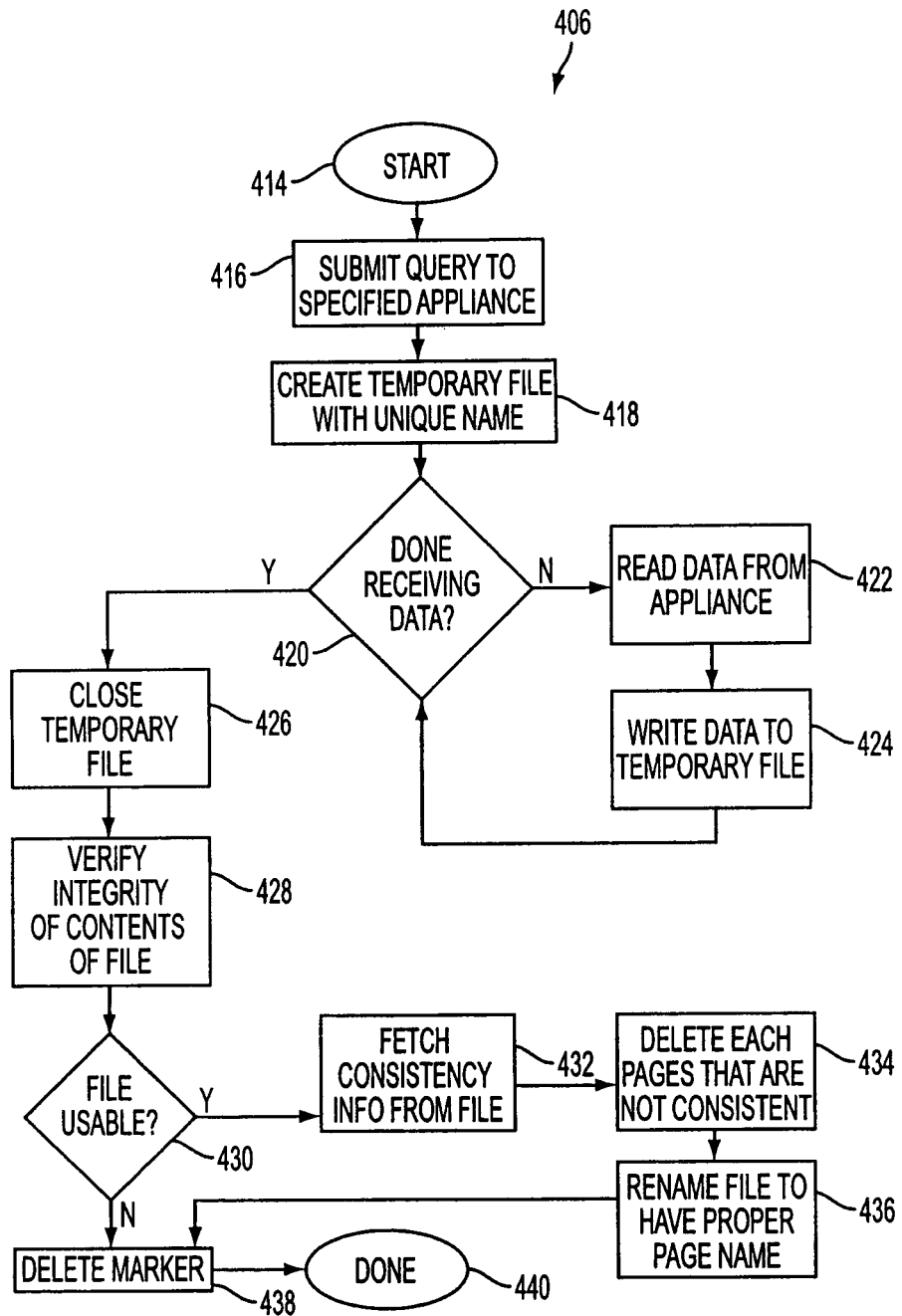
FIG. 20 is a flow diagram illustrating a process for a thread to fetch a page in FIG. 19.

FIG. 20 shows the process that is executed by the thread that is started in FIG. 19. The thread's purpose is to handle the communication with a single appliance server and obtain a single page of data. That is, in FIG. 20, the process 406 of FIG. 19 for initiating a thread to fetch a page is illustrated in greater detail. The process 406 begins at 414 and, in an operation 416 a query is submitted to a specified appliance (as broadly defined previously). Then, in an operation 418, a temporary file is created with a unique name. Decision operation 420 determines whether all of the data has been received and, if not, operation 422 reads data from the designated appliance. Operation 424 then writes the data to the temporary file, at which time process control is returned to operation 420.

If operation 420 determines that all of the data has been received from the appliance, then operation 426 closes the temporary file, and operation 428 verifies the integrity of the contents of the temporary file. If operation 430 determines that the temporary file is usable, operation 432 fetches the consistency information from the file, and an operation 434 deletes cached pages that were not consistent. Consistency information is the information that indicates that this file is responsive to the request. Operation 436 renames the file to have the proper page name as described previously, and an operation 438 deletes the marker. The process 406 is then completed at 440. If operation 430 determines that the temporary file was not usable, the marker is simply deleted in operation 438 and, again, the process 406 is completed at 440.

Figure 21:
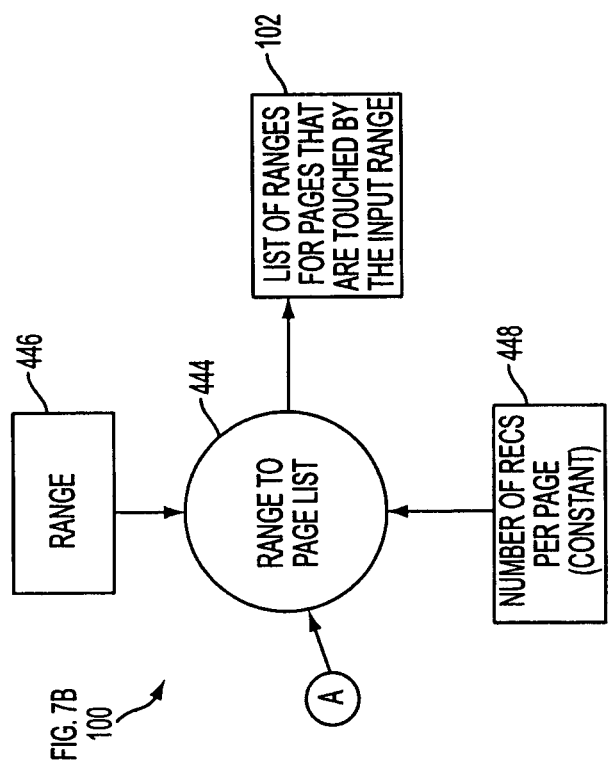
FIG. 21 is an illustration of a range to page list process of FIG. 7b.

FIG. 21 shows the process by which a set of ranges for appliance servers is converted into a list of ranges for physical pages that are required to fulfill the desired input range. More specifically, FIG. 21 illustrates the range-to-page list object 100 of FIG. 7b in slightly greater detail. The range-to-page list object 100 includes a range-to-page list function 444 responsive to a range parameters 446 and a constant num_recs 448 of the number of records per page. The output of the range-to-page list function 444 is the list of ranges 102 for pages that are "touched" by the input range.

Figure 22:
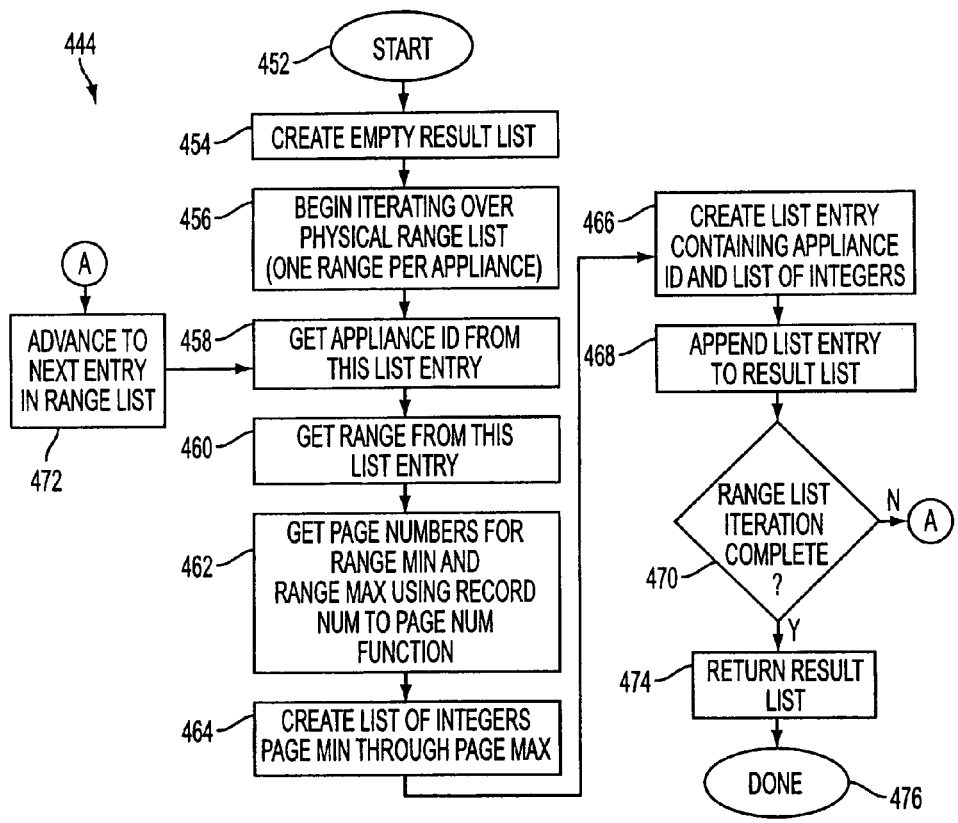
FIG. 22 is a flow diagram illustrating a process for converting a range list to a page list of FIG. 21.

FIG. 22 illustrates the range-to-page function 444 of FIG. 21 in greater detail. The process 444 begins at 452 and, in an operation 454 an empty list result_list is created. Operation 456 begins iterating over a list physical_range (where there is one range per appliance). Operation 458 gets the appliance identification (id) from the list entry in physical_range. Operation 460 gets the range from physical_range.

Next, operation 462 retrieves the page number for variable range_min and range_max using a RecordNum to PageNum function. Operation 464 creates a list of integers page_min through page_max. Operation 466 creates a list entry containing appliance id and a list of integers. Operation 468 appends the list entry to the result_list.

Next, decision operation 470 determines whether the range_list iteration is complete. If not, an operation 472 advances to the next entry in range_list, and process control is returned to operation 458. Otherwise, the result_list is returned in an operation 474, and the process 444 is completed at 476.

Figure 23:
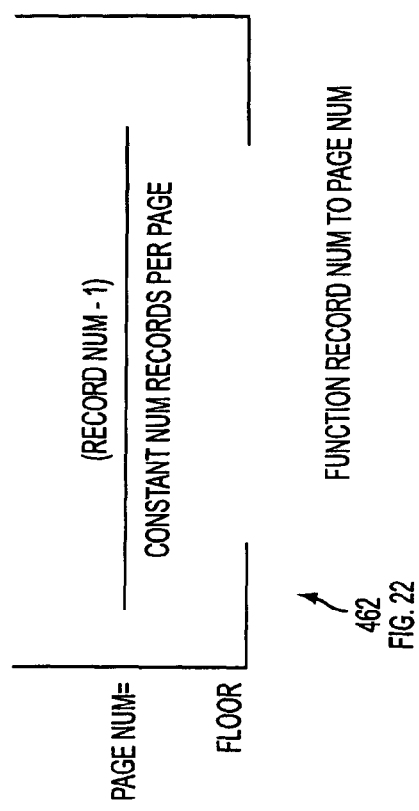
FIG. 23 illustrates a formula used to convert a record number to a page number in FIG. 22.

FIG. 23 illustrates the algorithm used to convert RecordNum to PageNum, as in operation 462 of FIG. 22. The algorithm is as follows:

$$\text{PageNum} = \text{Floor}[(\text{RecordNum} - 1)/(\text{constant number of records per page})] \quad \text{formula 4}$$

It should be noted that the above methodologies and procedures are preferred embodiments for accomplishing the task of allowing records responsive to an initial query to be viewed, in a consolidated manner, from a number of discrete databases. These discrete databases can be found on a single computer or "machine", or can be distributed in multiple real or virtual machines. The methodology for distributing an initial query among various databases and then consolidating the replies for a unified resultant can take many forms. For example, an appliance can have the functionality for viewing the results of a request forwarded to a multiplicity of databases on, for example, other appliances as a functional part of its own system.

From the forgoing, it will be appreciated that an aspect of the present invention is to provide a virtual database system including multiple independent database servers. The "virtual database system" is the use of a unified interface to query multiple databases, and the "multiple independent database servers" include appliances, general servers, etc. The system preferably includes a packet-based network, and a number of physically separated, independent database servers coupled to the network, where each of the database servers has a unique address and an independent database interface. Preferably, each database server includes an database created at least in part by the passive capture of data on the network, and each of which supports database queries including at least one of metadata and text via its respective interface.

The system also preferably includes a virtual database server receiving a virtual database query from an originator and, in response thereto, directing a number of server queries to the number of database servers via their respective interfaces. The virtual database server then collects responses from the number of database servers, composes the collected responses into a unified response, and presents the unified response to the originator of the virtual database query.

Preferably the network is a TCP/IP based network, and wherein the number of database servers communicate via TCP/IP and each include a unique IP addresses. The TCIP/IP based network may be a local area network (LAN) such as an Intranet, or a wide area network (WAN) such as the Internet.

The passive capture of data by the database servers preferably includes the passive capture of at least one of e-mail, FTP, copy and print capture. This is preferably accomplished by providing at least one data capture device coupled to the network and producing at least one of the e-mail, FTP, copy and print capture protocol data. These data capture devices can include at least one of an e-mail system, a photocopier, a scanner, a facsimile machine, and a personal computer in conjunction with a network interface.

Preferably, each of the database servers is associated with a backup storage device. The backup storage can be dedicated or shared.

In another aspect of the present invention, a virtual database system including multiple databases includes a network, a number of databases capable of receiving queries via the network, and a virtual database server being capable of receiving a virtual database query from an originator via the network. The virtual database server parses the virtual database query into a number of related database queries, and presents the number of related database queries to the number of databases for concurrent processing. The virtual database server collects responses to the number of related database queries from the number of databases as they are generated and maps the responses into a unified response to provide to the originator of the virtual database query. In one embodiment, the originator is at least one of a human originator, a virtual database server originator, and an agent originator.

Preferably, the virtual database server replicates the virtual database query as the number of related database queries, and may modify the virtual database query for at least one of the related database queries. Preferably, the virtual database query includes a query portion, a view portion, and a range portion. Such a query structure can be found, for example, in the Ricoh eCabinet® appliance. The virtual database server may further modify at least a range portion of at least one related database query.

As will also be appreciated from the foregoing, another aspect of the present invention is that it provides a method for viewing multiple appliance databases without the requirement for modifying those appliances by distributing queries as a virtual user. In summary, the method includes receiving a database query from a user, distributing said query to a plurality of appliance servers as a virtual user, each of which has its own query interface. By "virtual user" is it meant that the appliance server cannot tell that the query being presented to it is other than a query being presented directly from a user, i.e. the process of the present invention emulates the actions of a user. The method further includes receiving records from said plurality of appliance servers responsive to said query; and consolidating said records from said plurality of appliance servers for presentation to said user. In one embodiment of the present invention, the database query is received by a general server which is at least logically separate from the appliance servers. In another embodiment of the present invention the database query is received by one of said plurality of appliance servers and then distributed to itself and at least one other appliance server. If the appliance server has a different interfaced or protocol, the query can be modified for that appliance server. In one preferred embodiment, the records from the various appliance servers are interleaved and presented in a common interface to the user.

While the present invention has been described in terms of a number of preferred embodiments, it will be appreciated by those skilled in the art that there are a number of modifications, additions, permutations and equivalents thereto. It is therefore intended that the following appended claims be intereripted as including all such modifications, additions, permutations and equivalents as fall within the true spirit and scope of the present invention.

What is claimed is:

1. A method for viewing multiple databases comprising:
receiving at a general server, coupled to a network, a database query from a user;
modifying said database query for at least one of a plurality of appliance servers;
distributing a plurality of appliance queries derived from said database query to said plurality of appliance servers coupled to said network as a virtual user, where each of said plurality of appliance servers has an appliance HTML query interface such that an appliance server cannot tell that a query being presented to it is other than a query being presented directly from said user, and where each of said plurality of appliance servers passively captures documents over said network derived from at least one of a photocopier, a scanner and a facsimile machine coupled to said network, wherein said query is selectively distributed to less than all of said plurality of database servers;
receiving records from said less than all of said plurality of appliance servers responsive to said plurality of appliance queries;
developing a cache of records from said less than all of said plurality of database servers; and
consolidating said records from said less than all of said plurality of appliance servers for presentation to said user, wherein said consolidating of said records includes interleaving said records and presenting said records in a common interface.

2. A method for viewing multiple databases comprising:
developing a map of a plurality of database servers coupled to a network;
receiving a database query from a user over said network through at least one HTML page;
selectively distributing a plurality of server queries which are modified in accordance with said map to said plurality of database servers, each of which has a HTML query interface, wherein each query interface of said plurality of database servers is comprises an HTML page;
receiving records in the form of a plurality of HTML pages from said plurality of database servers responsive to said server queries;
developing a cache of records from said plurality of database servers; and
consolidating said records into at least one common HTML page from said plurality of database servers for presentation to said user by
(a) parsing said plurality of HTML pages from said plurality of database servers,
(b) filtering said parsed plurality of HTML pages, and
(b) constructing at least one consolidated HTML page from said plurality of filtered, parsed HTML pages;
wherein said query is selectively distributed to less than all of said plurality of database servers.

3. A system for querying multiple databases comprising:
a plurality of database servers coupled to a network and having at least two different HTML query interfaces; and
a general server coupled to said network and configured to develop a map of said plurality of database servers, said general server being further configured to:
 a) receive a general server query from a user through at least one HTML page;
 b) selectively distribute at least one database server query derived from said general server query in accordance with said map of said plurality of database servers, wherein said query is selectively distributed to less than all of said plurality of database servers;
 c) receive at least one record in the form of an HTML page from said plurality of database servers;
 d) developing a cache of records from said plurality of database servers; and
 e) consolidate said at least one record into at least one common HTML page for presentation to said user.

4. A system for querying multiple databases comprising:
a plurality of appliance servers coupled to a network; and
a general server coupled to said network and configured to:
 a) receive a general server query from a user through at least one HTML page;
 b) selectively distribute database queries based upon said general server query to a plurality of appliance servers as a virtual user such that an appliance server cannot tell that a query being presented to it is other than a query being presented directly from said user, where each of said appliance servers has an HTML query interface, wherein said database queries are distributed to less than all of said plurality of database servers;
 c) receive records from said plurality of appliance servers responsive to said query;
 d) develop a cache of records from said plurality of database servers; and
 e) consolidate said records from said plurality of appliance servers for presentation to said user.

* * * * *